United States Patent
Baek et al.

(10) Patent No.: US 12,442,883 B2
(45) Date of Patent: Oct. 14, 2025

(54) METHOD FOR PERFORMING RELATIVE POSITIONING BY TERMINAL IN WIRELESS COMMUNICATION SYSTEM SUPPORTING SIDELINK, AND APPARATUS THEREFOR

(71) Applicant: LG ELECTRONICS INC., Seoul (KR)

(72) Inventors: Jongseob Baek, Seoul (KR); Hanbyul Seo, Seoul (KR); Woosuk Ko, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 769 days.

(21) Appl. No.: 17/755,559

(22) PCT Filed: Oct. 30, 2020

(86) PCT No.: PCT/KR2020/015040
§ 371 (c)(1),
(2) Date: May 2, 2022

(87) PCT Pub. No.: WO2021/086114
PCT Pub. Date: May 6, 2021

(65) Prior Publication Data
US 2022/0365163 A1  Nov. 17, 2022

(30) Foreign Application Priority Data

Nov. 1, 2019 (KR) .................. 10-2019-0138530
Nov. 1, 2019 (KR) .................. 10-2019-0138547

(51) Int. Cl.
*H04W 64/00* (2009.01)
*G01S 5/00* (2006.01)
(Continued)

(52) U.S. Cl.
CPC .......... *G01S 5/0072* (2013.01); *H04L 5/0051* (2013.01); *H04W 72/02* (2013.01); *H04W 72/0446* (2013.01)

(58) Field of Classification Search
None
See application file for complete search history.

(56) References Cited

U.S. PATENT DOCUMENTS

2015/0230112 A1\* 8/2015 Siomina ................ H04W 64/00
370/252
2017/0212206 A1 7/2017 Kim et al.
(Continued)

FOREIGN PATENT DOCUMENTS

KR  10-2019-0111813  10/2019
WO  2019-083344  5/2019

OTHER PUBLICATIONS

PCT International Application No. PCT/KR2020/015040, International Search Report dated Feb. 18, 2021, 3 pages.
(Continued)

*Primary Examiner* — Suhail Khan
(74) *Attorney, Agent, or Firm* — LEE, HONG, DEGERMAN, KANG & WAIMEY

(57) ABSTRACT

Disclosed are a method and apparatus for transmitting, by a first terminal, a first positioning reference signal (PRS) for relative positioning in a communication system that supports sidelink communication that supports a sidelink according to various embodiments. Disclosed are a method comprising the steps of: receiving a second PRS requesting transmission of the first PRS from a second terminal; measuring an angle of arrival (AoA) on the basis of the second PRS; determining a first PRS pattern of the first PRS on the basis of the AoA; determining a time resource region in which the transmission of the first PRS is requested on the basis of a second PRS pattern of the second PRS; and
(Continued)

transmitting the first PRS on the basis of the first PRS pattern and the determined time resource region, and an apparatus therefor.

13 Claims, 22 Drawing Sheets

(51) Int. Cl.
*H04L 5/00* (2006.01)
*H04W 72/02* (2009.01)
*H04W 72/0446* (2023.01)

(56) References Cited

U.S. PATENT DOCUMENTS

2019/0044667 A1  2/2019  Guo et al.
2019/0230618 A1  7/2019  Saur et al.

OTHER PUBLICATIONS

LG Electronics, "Discussion on physical layer procedures for NR sidelink," R1-1910783, 3GPP TSG RAN WG1 Meeting #98bis, Oct. 2019, 25 pages.
Huawei et al., "NR positioning measurements," R1-1910035, 3GPP TSG RAN WG1 Meeting #98bis, Oct. 2019, 21 pages.
Korean Intellectual Property Office Application No. 10-2022-7017584, Office Action dated Aug. 28, 2024, 6 pages.

\* cited by examiner (a)

(b)

(a)

(b)

(a)

(b)

(a)

(b)

METHOD FOR PERFORMING RELATIVE POSITIONING BY TERMINAL IN WIRELESS COMMUNICATION SYSTEM SUPPORTING SIDELINK, AND APPARATUS THEREFOR

CROSS-REFERENCE TO RELATED APPLICATIONS

This application is the National Stage filing under 35 U.S.C. 371 of International Application No. PCT/KR2020/015040, filed on Oct. 30, 2020, which claims the benefit of earlier filing date and right of priority to Korean Application Nos. 10-2019-0138530, filed on Nov. 1, 2019, and 10-2019-0138547, filed on Nov. 1, 2019, the contents of which are all hereby incorporated by reference herein in their entireties.

TECHNICAL FIELD

The present disclosure relates to a method of performing relative positioning by transmitting and receiving a positioning reference signal (PRS) by a user equipment (UE) in a wireless communication system for supporting sidelink and an apparatus for the method.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.). Examples of multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi carrier frequency division multiple access (MC-FDMA) system.

A sidelink (SL) refers to a communication method in which a direct link is established between user equipment (UE), and voice or data is directly exchanged between terminals without going through a base station (BS). SL is being considered as one way to solve the burden of the base station due to the rapidly increasing data traffic.

V2X (vehicle-to-everything) refers to a communication technology that exchanges information with other vehicles, pedestrians, and infrastructure-built objects through wired/wireless communication. V2X may be divided into four types: vehicle-to-vehicle (V2V), vehicle-to-infrastructure (V2I), vehicle-to-network (V2N), and vehicle-to-pedestrian (V2P). V2X communication may be provided through a PC5 interface and/or a Uu interface.

As more and more communication devices require larger communication capacities in transmitting and receiving signals, there is a need for mobile broadband communication improved from the legacy radio access technology. Accordingly, communication systems considering services/UEs sensitive to reliability and latency are under discussion. A next-generation radio access technology in consideration of enhanced mobile broadband communication, massive Machine Type Communication (MTC), and Ultra-Reliable and Low Latency Communication (URLLC) may be referred to as new radio access technology (RAT) or new radio (NR). Even in NR, vehicle-to-everything (V2X) communication may be supported.

FIG. 1 is a diagram comparing RAT-based V2X communication before NR with NR-based V2X communication.

Regarding V2X communication, in RAT prior to NR, a scheme for providing a safety service based on V2X messages such as a basic safety message (BSM), a cooperative awareness message (CAM), and a decentralized environmental notification message (DENM) was mainly discussed. The V2X message may include location information, dynamic information, and attribute information. For example, the UE may transmit a periodic message type CAM and/or an event triggered message type DENM to another UE.

For example, the CAM may include dynamic state information about a vehicle such as direction and speed, vehicle static data such as dimensions, and basic vehicle information such as external lighting conditions and route details. For example, a UE may broadcast the CAM, and the CAM latency may be less than 100 ms. For example, when an unexpected situation such as a breakdown of the vehicle or an accident occurs, the UE may generate a DENM and transmit the same to another UE. For example, all vehicles within the transmission coverage of the UE may receive the CAM and/or DENM. In this case, the DENM may have a higher priority than the CAM.

Regarding V2X communication, various V2X scenarios have been subsequently introduced in NR. For example, the various V2X scenarios may include vehicle platooning, advanced driving, extended sensors, and remote driving.

For example, based on vehicle platooning, vehicles may dynamically form a group and move together. For example, to perform platoon operations based on vehicle platooning, vehicles belonging to the group may receive periodic data from a leading vehicle. For example, the vehicles belonging to the group may reduce or increase the distance between the vehicles based on the periodic data.

For example, based on advanced driving, a vehicle may be semi-automated or fully automated. For example, each vehicle may adjust trajectories or maneuvers based on data acquired from local sensors of nearby vehicles and/or nearby logical entities. Also, for example, each vehicle may share driving intention with nearby vehicles.

For example, on the basis of extended sensors, raw data or processed data acquired through local sensors, or live video data may be exchanged between a vehicle, a logical entity, UEs of pedestrians and/or a V2X application server. Thus, for example, the vehicle may recognize an environment that is improved over an environment that may be detected using its own sensor.

For example, for a person who cannot drive or a remote vehicle located in a dangerous environment, a remote driver or V2X application may operate or control the remote vehicle based on remote driving. For example, when a route is predictable as in the case of public transportation, cloud computing-based driving may be used to operate or control the remote vehicle. For example, access to a cloud-based back-end service platform may be considered for remote driving.

A method to specify service requirements for various V2X scenarios such as vehicle platooning, advanced driving, extended sensors, and remote driving is being discussed in the NR-based V2X communication field.

DISCLOSURE

Technical Problem

An objective is to provide a method and an apparatus for rapidly allocating resources of response PRSs between vehicles that rapidly move by allocating a time resource region and a PRS pattern of a response PRS in response to a received request PRS according to a PRS pattern of the request PRS and an AoA measured from the request PRS and minimizing collision between the request PRSs by determining the PRS pattern based on the AoA in V2X communication with dense vehicles.

It will be appreciated by those of ordinary skill in the art to which the embodiment(s) pertain that the objects that could be achieved with the embodiment(s) are not limited to what has been particularly described hereinabove and the above and other objects will be more clearly understood from the following detailed description.

Technical Solution

According to an aspect, a method of transmitting a first positioning reference signal (PRS) for relative positioning by a first user equipment (UE) in a communication system for supporting sidelink communication includes receiving a second PRS that requests transmission of the first PRS from a second UE, measuring an angle of arrival (AoA) based on the second PRS, determining a first PRS pattern of the first PRS based on the AoA, determining a time resource region in which transmission of the first PRS is requested based on a second PRS pattern of the second PRS, and transmitting the first PRS based on the first PRS pattern and the determined time resource region.

The first PRS pattern may be determined as one PRS pattern corresponding to the measured AoA among a plurality of PRS patterns included in the time resource region determined based on the second PRS pattern.

The UE may request an AoA report of one anchor node through transmission of a PRS in a PRS resource pool pre-configured for the one anchor node.

The first PRS may be transmitted in the time resource region in the same slot as a slot in which the second PRS is received.

The first PRS may be transmitted in the time resource region in a different slot from a slot in which the second PRS is received.

The slot may include a subchannel resource pool for control information for scheduling the second PRS, a request PRS resource pool for the second PRS, and a response PRS resource pool for the first PRS.

The time resource region may be determined as at least one consecutive OFDM symbol pre-related to the second PRS pattern in the response PRS resource pool.

The slot may further include a transition OFDM symbol positioned between the subchannel resource pool and the request PRS resource pool.

The slot may further include a guard OFDM symbol between the request PRS resource pool and the response PRS resource pool.

An AoA offset value for matching with local coordinates of the second UE is applied to the AoA.

The first UE may acquire information on a heading angle of the second UE from the second UE and may calculate the AoA offset value based on the heading angle of the second UE and a heading angle of the first UE.

The first UE may transmit the first PRS with information on a Tx-Rx time difference (TRTD) to the second UE.

According to another aspect, a method of performing relative positioning by a second user equipment (UE) in a wireless communication system for supporting sidelink includes transmitting a second PRS that requests transmission of a first positioning reference signal (PRS), receiving a first PRS in response to the second PRS, and acquiring information related to an angle of arrival (AoA) based on a first PRS pattern of the first PRS, wherein the first PRS is received in a time resource region determined based on a second PRS pattern of the second PRS.

According to another aspect, a first user equipment (UE) for transmitting a first positioning reference signal (PRS) for relative positioning in a wireless communication system for supporting sidelink includes a radio frequency (RF) transceiver, and a processor connected to the RF transceiver. The processor may control the RF transceiver to receive a second PRS that requests transmission of the first PRS from a second UE, may measure an angle of arrival (AoA) based on the second PRS, may determine a first PRS pattern of the first PRS based on the AoA, may determine a time resource region in which transmission of the first PRS is requested based on a second PRS pattern of the second PRS, and may control the RF transceiver to transmit the first PRS based on the first PRS pattern and the determined time resource region.

According to another aspect, a second user equipment (UE) for performing relative positioning in a wireless communication system for supporting sidelink includes a radio frequency (RF) transceiver, and a processor connected to the RF transceiver. The processor may control the RF transceiver to transmit a second positioning reference signal (PRS) that requests transmission of a first PRS and to receive a first PRS in response to the second PRS and may acquire information related to an angle of arrival (AoA) based on a first PRS pattern of the first PRS, and the first PRS may be received in a time resource region determined based on a second PRS pattern of the second PRS.

According to another aspect, a chip set for transmitting a first positioning reference signal (PRS) for relative positioning in a wireless communication system for supporting sidelink includes at least one processor, and at least one memory operatively connected to the at least one processor and configured to cause the at least one processor to perform an operation when being executed by the at least one processor, wherein the operation incudes receiving a second PRS that requests transmission of the first PRS from a second UE, measuring an angle of arrival (AoA) based on the second PRS, determining a first PRS pattern of the first PRS based on the AoA, determining a time resource region in which transmission of the first PRS is requested based on a second PRS pattern of the second PRS, and transmitting the first PRS based on the first PRS pattern and the determined time resource region.

The processor may control a driving mode of a device connected to the chip set based on the AoA.

According to another aspect, a computer-readable recording medium containing at least one computer program for transmitting a first positioning reference signal (PRS) for relative positioning by at least one processor in a wireless communication system for supporting sidelink includes at least one program for causing the at least one processor to perform an operation of transmitting the first PRS, and a computer-readable recording medium storing the at least one computer program, wherein the operation includes receiving a second PRS that requests transmission of the first PRS from a second UE, measuring an angle of arrival (AoA) based on the second PRS, determining a first PRS pattern of the first PRS based on the AoA, determining a time resource region in which transmission of the first PRS is requested based on a second PRS pattern of the second PRS, and transmitting the first PRS based on the first PRS pattern and the determined time resource region.

Advantageous Effects

Various embodiments may rapidly allocate resources of response PRSs between vehicles that rapidly move by allocating a time resource region and a PRS pattern of a response PRS in response to a received request PRS according to a PRS pattern of the request PRS and an AoA measured from the request PRS and may minimize collision between the request PRSs by determining the PRS pattern based on the AoA in V2X communication with dense vehicles.

Effects to be achieved by embodiment(s) are not limited to what has been particularly described hereinabove and other effects not mentioned herein will be more clearly understood by persons skilled in the art to which embodiment(s) pertain from the following detailed description.

DESCRIPTION OF DRAWINGS

The accompanying drawings, which are included to provide a further understanding of the disclosure and are incorporated in and constitute a part of this application, illustrate embodiments of the disclosure and together with the description serve to explain the principle of the disclosure.

BEST MODE

Figure 1:
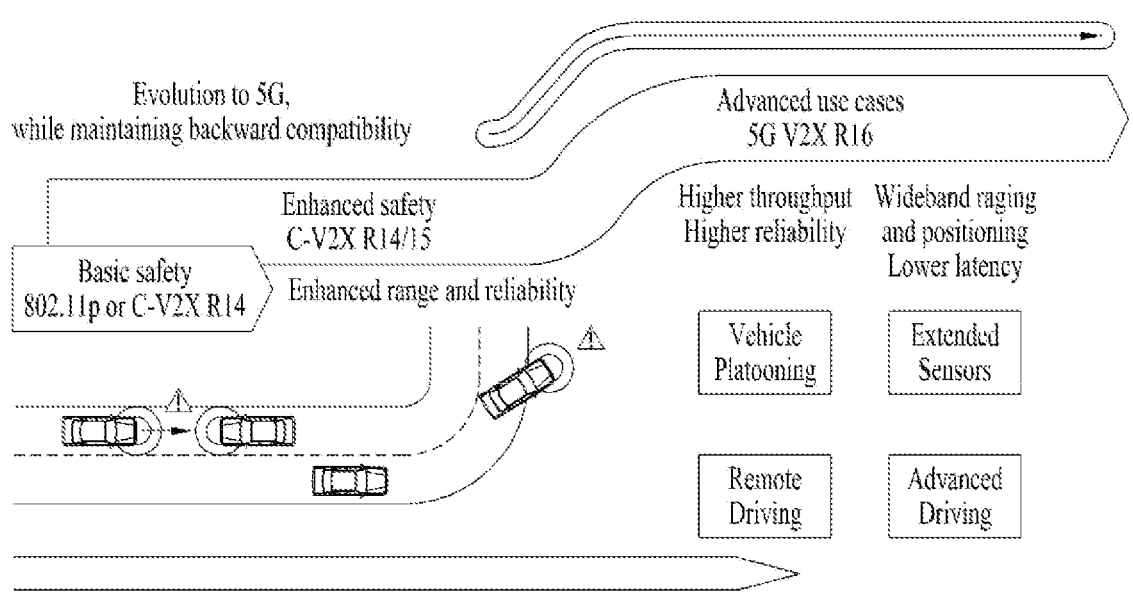
FIG. 1 is a diagram for explaining by comparing V2X communication based on RAT before NR and V2X communication based on NR.

The wireless communication system is a multiple access system that supports communication with multiple users by sharing available system resources (e.g., bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, a single carrier frequency (SC-FDMA) system, a multi carrier frequency division multiple access (MC-FDMA) system, and the like.

A sidelink refers to a communication scheme in which a direct link is established between user equipments (UEs) to directly exchange voice or data between UEs without assistance from a base station (BS). The sidelink is being considered as one way to address the burden on the BS caused by rapidly increasing data traffic.

Vehicle-to-everything (V2X) refers to a communication technology for exchanging information with other vehicles, pedestrians, and infrastructure-built objects through wired/wireless communication. V2X may be divided into four types: vehicle-to-vehicle (V2V), vehicle-to-infrastructure (V2I), vehicle-to-network (V2N), and vehicle-to-pedestrian (V2P). V2X communication may be provided through a PC5 interface and/or a Uu interface.

As more and more communication devices require larger communication capacities in transmitting and receiving signals, there is a need for mobile broadband communication improved from the legacy radio access technology. Accordingly, communication systems considering services/UEs sensitive to reliability and latency are under discussion. A next-generation radio access technology in consideration of enhanced mobile broadband communication, massive MTC, and Ultra-Reliable and Low Latency Communication (URLLC) may be referred to as new radio access technology (RAT) or new radio (NR). Even in NR, V2X communication may be supported.

Techniques described herein may be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), etc. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA) etc. UTRA is a part of universal mobile telecommunications system (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. 3GPP NR (New Radio or New Radio Access Technology) is an evolved version of 3GPP LTE/LTE-A/LTE-A pro.

5G NR is a successor technology of LTE-A, and is a new clean-slate mobile communication system with characteristics such as high performance, low latency, and high availability. 5G NR may utilize all available spectrum resources, from low frequency bands below 1 GHz to intermediate frequency bands from 1 GHz to 10 GHz and high frequency (millimeter wave) bands above 24 GHz.

Figure 2:
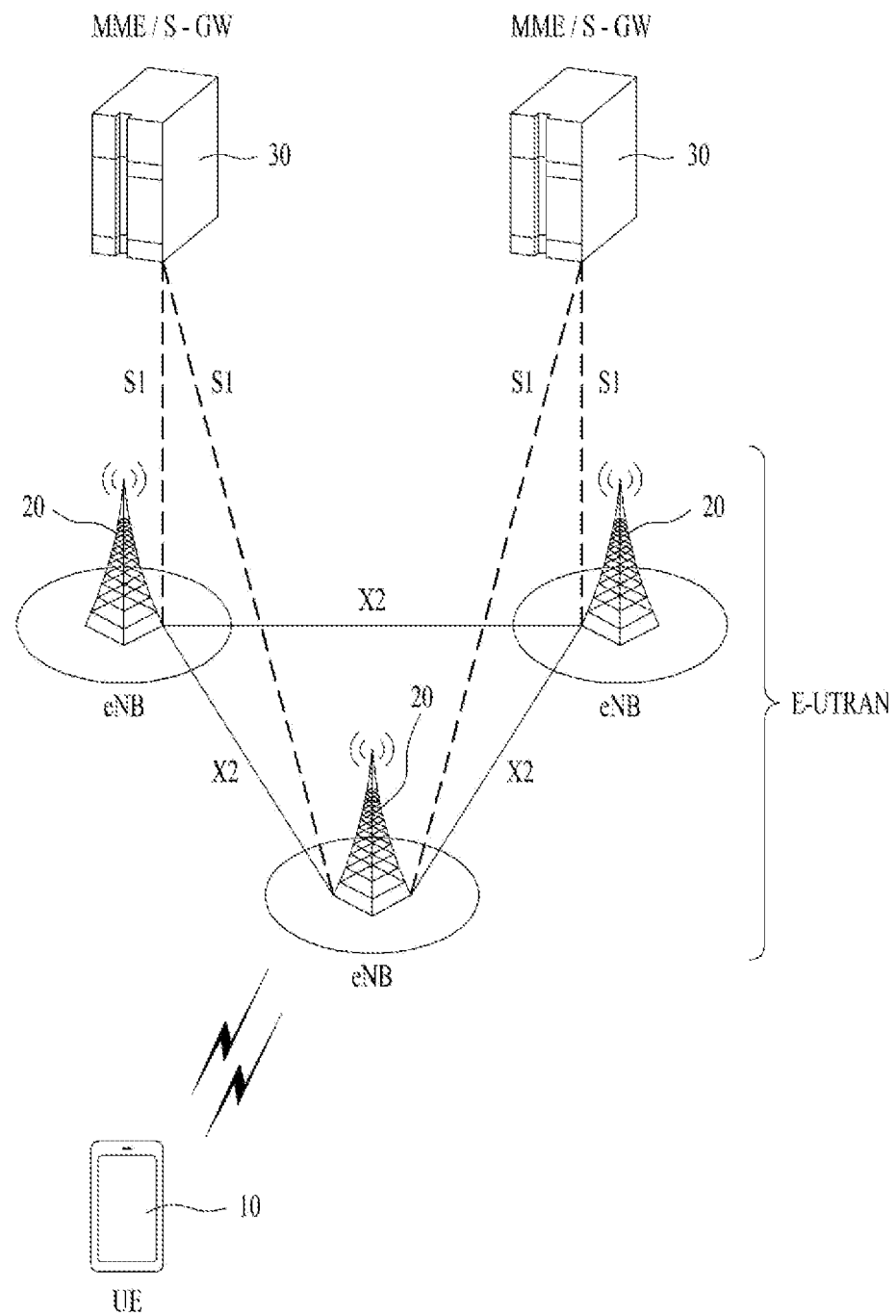
FIG. 2 illustrates the structure of an LTE system to which embodiment(s) are applicable.

For clarity of explanation, LTE-A or 5G NR is mainly described, but the technical spirit of the embodiment(s) is not limited thereto FIG. 2 illustrates the structure of an LTE system to which the present disclosure is applicable. This may also be called an evolved UMTS terrestrial radio access network (E-UTRAN) or LTE/LTE-A system.

Referring to FIG. 2, the E-UTRAN includes evolved Node Bs (eNBs) 20 which provide a control plane and a user plane to UEs 10. A UE 10 may be fixed or mobile, and may also be referred to as a mobile station (MS), user terminal (UT), subscriber station (SS), mobile terminal (MT), or wireless device. An eNB 20 is a fixed station communication with the UE 10 and may also be referred to as a base station (BS), a base transceiver system (BTS), or an access point.

eNBs 20 may be connected to each other via an X2 interface. An eNB 20 is connected to an evolved packet core (EPC) 39 via an S1 interface. More specifically, the eNB 20 is connected to a mobility management entity (MME) via an S1-MME interface and to a serving gateway (S-GW) via an S1-U interface.

The EPC 30 includes an MME, an S-GW, and a packet data network-gateway (P-GW). The MME has access information or capability information about UEs, which are mainly used for mobility management of the UEs. The S-GW is a gateway having the E-UTRAN as an end point, and the P-GW is a gateway having a packet data network (PDN) as an end point.

Based on the lowest three layers of the open system interconnection (OSI) reference model known in communication systems, the radio protocol stack between a UE and a network may be divided into Layer 1 (L1), Layer 2 (L2) and Layer 3 (L3). These layers are defined in pairs between a UE and an Evolved UTRAN (E-UTRAN), for data transmission via the Uu interface. The physical (PHY) layer at L1 provides an information transfer service on physical channels. The radio resource control (RRC) layer at L3 functions to control radio resources between the UE and the network. For this purpose, the RRC layer exchanges RRC messages between the UE and an eNB.

Figure 3:
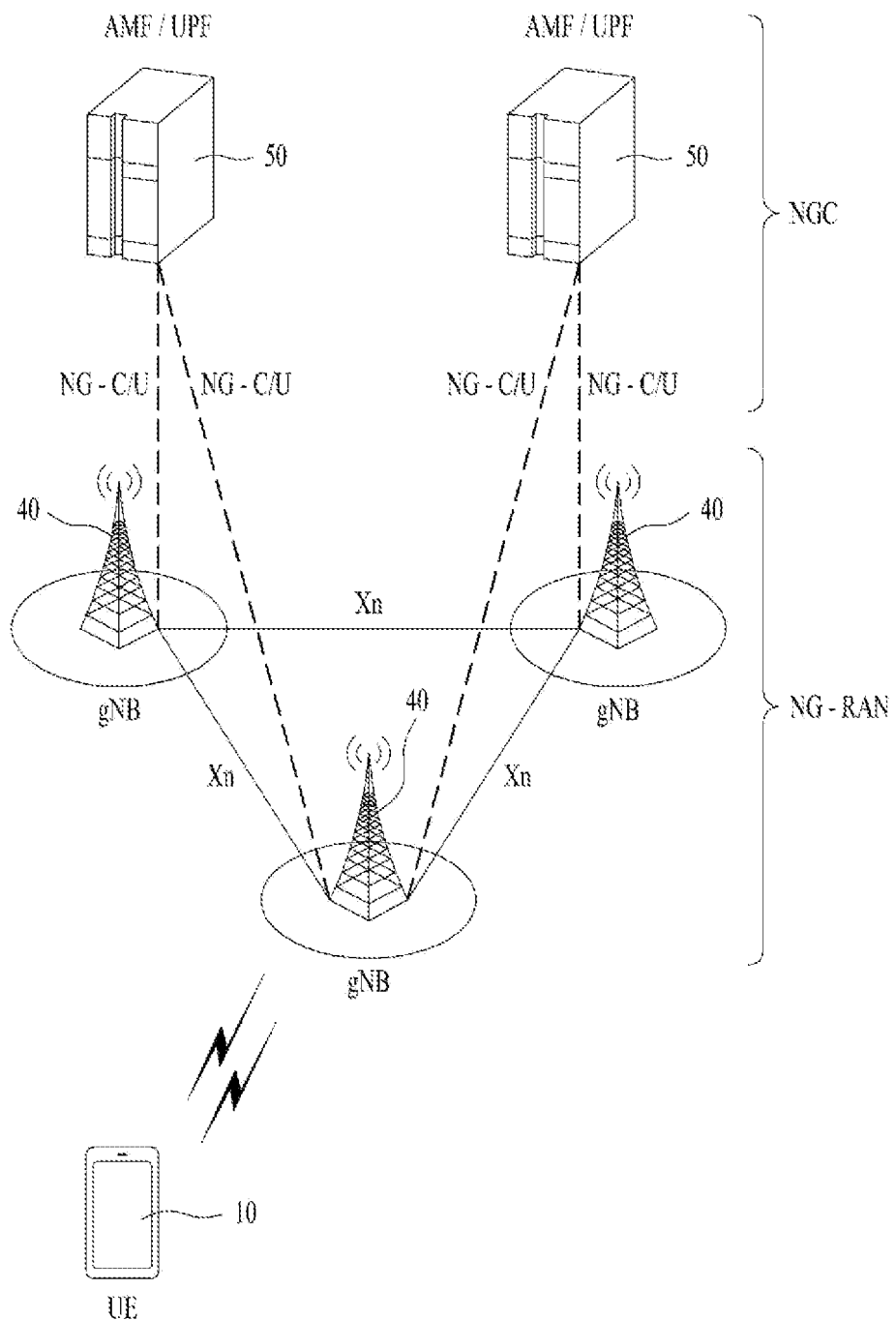
FIG. 3 illustrates the structure of an NR system to which embodiment(s) are applicable.

FIG. 3 illustrates the structure of a NR system to which the present disclosure is applicable.

Referring to FIG. 3, a next generation radio access network (NG-RAN) may include a next generation Node B (gNB) and/or an eNB, which provides user-plane and control-plane protocol termination to a UE. In FIG. 3, the NG-RAN is shown as including only gNBs, by way of example. A gNB and an eNB are connected to each other via an Xn interface. The gNB and the eNB are connected to a 5G core network (5GC) via an NG interface. More specifically, the gNB and the eNB are connected to an access and mobility management function (AMF) via an NG-C interface and to a user plane function (UPF) via an NG-U interface.

Figure 4:
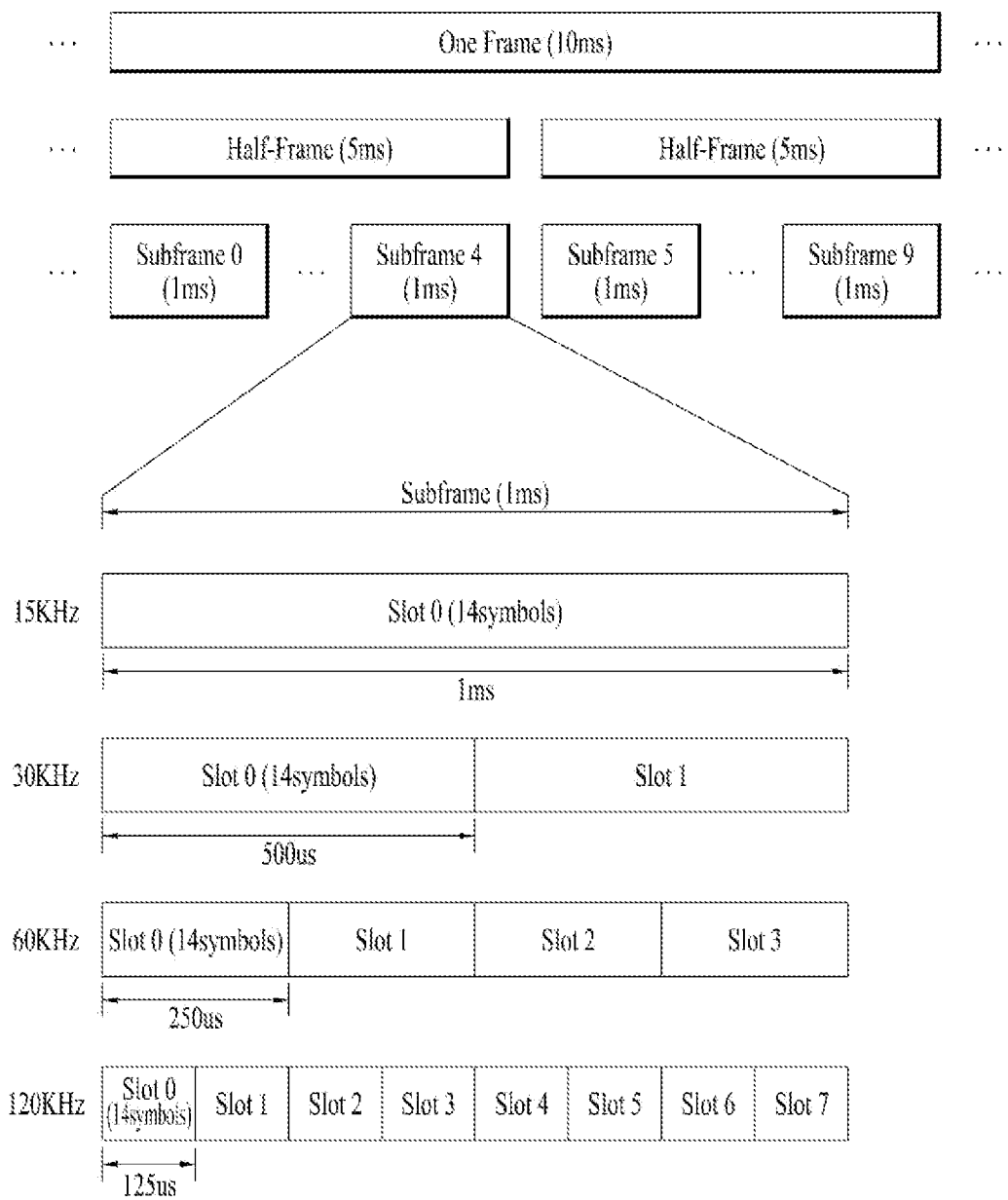
FIG. 4 illustrates the structure of an NR radio frame to which embodiment(s) are applicable.

FIG. 4 illustrates the structure of a NR radio frame to which the present disclosure is applicable.

Referring to FIG. 4, a radio frame may be used for UL transmission and DL transmission in NR. A radio frame is 10 ms in length, and may be defined by two 5-ms half-frames. An HF may include five 1-ms subframes. A subframe may be divided into one or more slots, and the number of slots in an SF may be determined according to a subcarrier spacing (SCS). Each slot may include 12 or 14 OFDM(A) symbols according to a cyclic prefix (CP).

In a normal CP (NCP) case, each slot may include 14 symbols, whereas in an extended CP (ECP) case, each slot may include 12 symbols. Herein, a symbol may be an OFDM symbol (or CP-OFDM symbol) or an SC-FDMA symbol (or DFT-s-OFDM symbol).

Table 1 below lists the number of symbols per slot $N^{slot}_{symb}$, the number of slots per frame $N^{frame,u}_{slot}$, and the number of slots per subframe $N^{subframe,u}_{slot}$ according to an SCS configuration μ in the NCP case.

TABLE 1

| SCS (15*2u) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 below lists the number of symbols per slot, the number of slots per frame, and the number of slots per subframe according to an SCS in the ECP case.

TABLE 2

| SCS (15*2^u) | $N^{slot}_{symb}$ | $N^{frame, u}_{slot}$ | $NT^{subframe, u}_{slot}$ |
|---|---|---|---|
| 60 KHz (u = 2) | 12 | 40 | 4 |

In the NR system, different OFDM(A) numerologies (e.g., SCSs, CP lengths, etc.) may be configured for a plurality of cells aggregated for one UE. Thus, the (absolute) duration of a time resource (e.g., SF, slot, or TTI) including the same number of symbols may differ between the aggregated cells (such a time resource is commonly referred to as a time unit (TU) for convenience of description).

In NR, multiple numerologies or SCSs to support various 5G services may be supported. For example, a wide area in conventional cellular bands may be supported when the SCS is 15 kHz, and a dense urban environment, lower latency, and a wider carrier bandwidth may be supported when the SCS is 30 kHz/60 kHz. When the SCS is 60 kHz or higher, a bandwidth wider than 24.25 GHz may be supported to overcome phase noise.

The NR frequency band may be defined as two types of frequency ranges. The two types of frequency ranges may be FR1 and FR2. The numerical values of the frequency ranges may be changed. For example, the two types of frequency ranges may be configured as shown in Table 3 below. Among the frequency ranges used in the NR system, FR1 may represent "sub 6 GHz range" and FR2 may represent "above 6 GHz range" and may be called millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical values of the frequency ranges of the NR system may be changed. For example, FR1 may include a band of 410 MHz to 7125 MHz as shown in Table 4 below. That is, FR1 may include a frequency band of 6 GHz (or 5850 MHz, 5900 MHz, 5925 MHz, etc.) or higher. For example, the frequency band of 6 GHz (or 5850 MHz, 5900 MHz, 5925 MHz, etc.) or higher included in FR1 may include an unlicensed band. The unlicensed band may be used for various purposes, for example, for communication for vehicles (e.g., autonomous driving).

TABLE 4

| Frequency Range designation | Corresponding frequency range | Subcarrier Spacing (SCS) |
| --- | --- | --- |
| FR1 | 410 MHz-7125 MHz | 15, 30, 60 kHz |
| FR2 | 24250 MHz-52600 MHz | 60, 120, 240 kHz |

Figure 5:
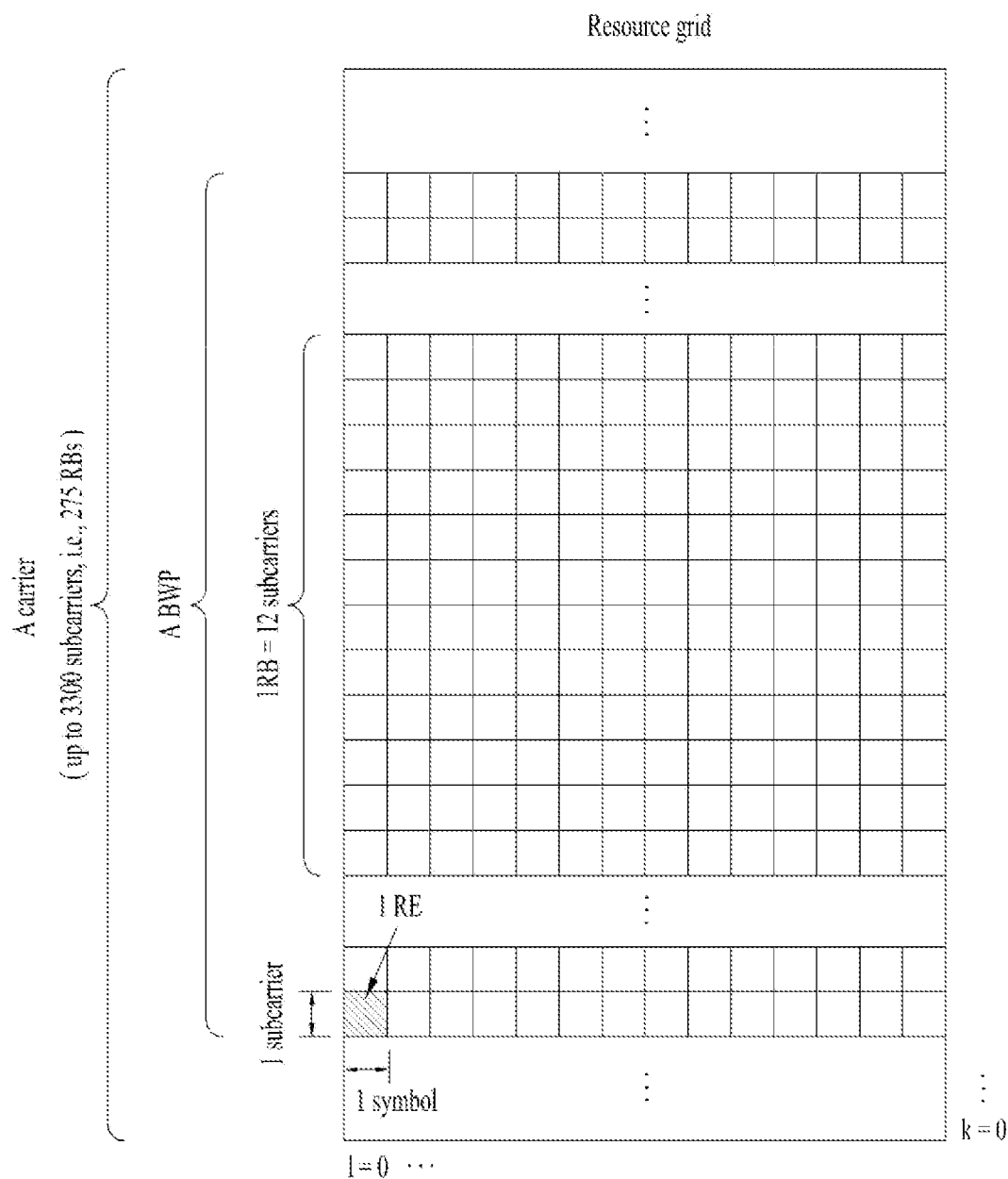
FIG. 5 illustrates the slot structure of an NR frame to which embodiment(s) are applicable.

FIG. 5 illustrates the slot structure of a NR frame to which the present disclosure is applicable.

Referring to FIG. 5, one slot includes a plurality of symbols in the time domain. For example, one slot may include 14 symbols in a normal CP and 12 symbols in an extended CP. Alternatively, one slot may include 7 symbols in the normal CP and 6 symbols in the extended CP.

A carrier may include a plurality of subcarriers in the frequency domain. A resource block (RB) is defined as a plurality of consecutive subcarriers (e.g., 12 subcarriers) in the frequency domain. A bandwidth part (BWP) may be defined as a plurality of consecutive (P)RBs in the frequency domain, and the BWP may correspond to one numerology (e.g., SCS, CP length, etc.). The carrier may include up to N (e.g., 5) BWPs. Data communication may be conducted in an activated BWP. In a resource grid, each element may be referred to as a resource element (RE) and may be mapped to one complex symbol.

The wireless interface between UEs or the wireless interface between a UE and a network may be composed of an L1 layer, an L2 layer, and an L3 layer. In various embodiments of the present disclosure, the L1 layer may represent a physical layer. The L2 layer may represent, for example, at least one of a MAC layer, an RLC layer, a PDCP layer, and an SDAP layer. The L3 layer may represent, for example, an RRC layer.

Hereinafter, V2X or sidelink (SL) communication will be described.

Figure 6:
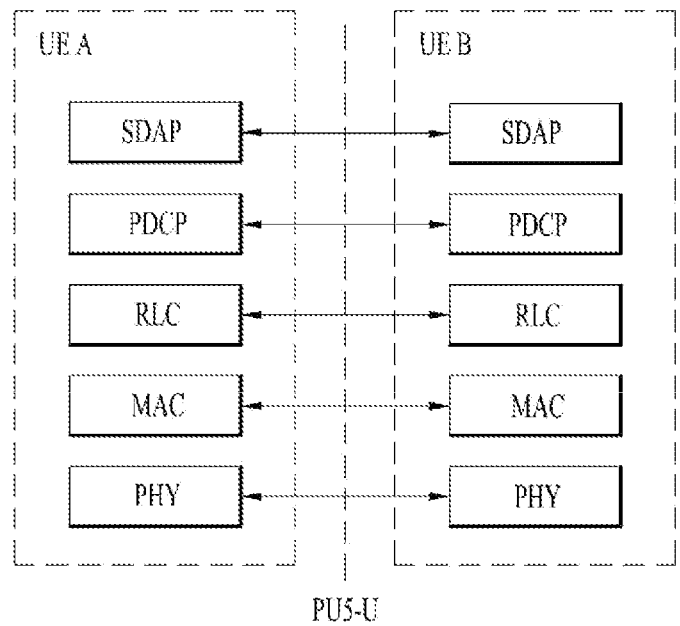
FIG. 6 illustrates a radio protocol architecture for SL communication.
Figure 6:
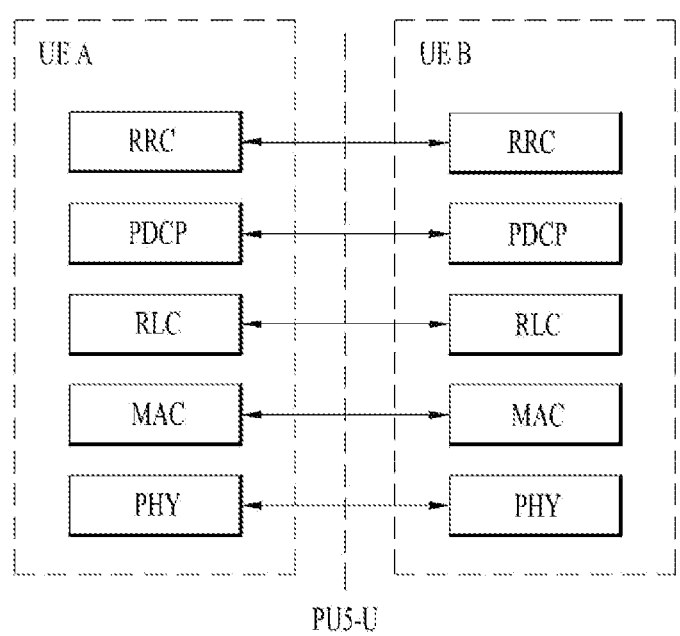

FIG. 6 illustrates a radio protocol architecture for SL communication. Specifically, FIG. 6-(a) shows a user plane protocol stack of NR, and FIG. 6-(b) shows a control plane protocol stack of NR.

Hereinafter, a sidelink synchronization signal (SLSS) and synchronization information will be described.

The SLSS is an SL-specific sequence, and may include a primary sidelink synchronization signal (PSSS) and a secondary sidelink synchronization signal (SSSS). The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, the UE may detect an initial signal and acquire synchronization using the S-PSS. For example, the UE may acquire detailed synchronization using the S-PSS and the S-SSS, and may detect a synchronization signal ID.

A physical sidelink broadcast channel (PSBCH) may be a (broadcast) channel on which basic (system) information that the UE needs to know first before transmission and reception of an SL signal is transmitted. For example, the basic information may include SLSS related information, a duplex mode (DM), time division duplex uplink/downlink (TDD UL/DL) configuration, resource pool related information, the type of an application related to the SLSS, a subframe offset, and broadcast information. For example, for evaluation of PSBCH performance, the payload size of PSBCH in NR V2X may be 56 bits including CRC of 24 bits.

The S-PSS, S-SSS, and PSBCH may be included in a block format (e.g., an SL synchronization signal (SS)/PSBCH block, hereinafter sidelink-synchronization signal block (S-SSB)) supporting periodic transmission. The S-SSB may have the same numerology (i.e., SCS and CP length) as a physical sidelink control channel (PSCCH)/physical sidelink shared channel (PSSCH) in the carrier, and the transmission bandwidth thereof may be within a (pre)set sidelink BWP (SL BWP). For example, the bandwidth of the S-SSB may be 11 resource blocks (RBs). For example, the PSBCH may span 11 RBs. The frequency position of the S-SSB may be (pre)set. Accordingly, the UE does not need to perform hypothesis detection at a frequency to discover the S-SSB in the carrier.

In the NR SL system, a plurality of numerologies having different SCSs and/or CP lengths may be supported. In this case, as the SCS increases, the length of the time resource in which the transmitting UE transmits the S-SSB may be shortened. Thereby, the coverage of the S-SSB may be narrowed. Accordingly, in order to guarantee the coverage of the S-SSB, the transmitting UE may transmit one or more S-SSBs to the receiving UE within one S-SSB transmission period according to the SCS. For example, the number of S-SSBs that the transmitting UE transmits to the receiving UE within one S-SSB transmission period may be pre-configured or configured for the transmitting UE. For example, the S-SSB transmission period may be 160 ms. For example, for all SCSs, the S-SSB transmission period of 160 ms may be supported.

For example, when the SCS is 15 kHz in FR1, the transmitting UE may transmit one or two S-SSBs to the receiving UE within one S-SSB transmission period. For example, when the SCS is 30 kHz in FR1, the transmitting UE may transmit one or two S-SSBs to the receiving UE within one S-SSB transmission period. For example, when the SCS is 60 kHz in FR1, the transmitting UE may transmit one, two, or four S-SSBs to the receiving UE within one S-SSB transmission period.

For example, when the SCS is 60 kHz in FR2, the transmitting UE may transmit 1, 2, 4, 8, 16 or 32 S-SSBs to the receiving UE within one S-SSB transmission period. For example, when SCS is 120 kHz in FR2, the transmitting UE may transmit 1, 2, 4, 8, 16, 32 or 64 S-SSBs to the receiving UE within one S-SSB transmission period.

When the SCS is 60 kHz, two types of CPs may be supported. In addition, the structure of the S-SSB transmitted from the transmitting UE to the receiving UE may depend on the CP type. For example, the CP type may be normal CP (NCP) or extended CP (ECP). Specifically, for example, when the CP type is NCP, the number of symbols to which the PSBCH is mapped in the S-SSB transmitted by the transmitting UE may be 9 or 8. On the other hand, for example, when the CP type is ECP, the number of symbols to which the PSBCH is mapped in the S-SSB transmitted by the transmitting UE may be 7 or 6. For example, the PSBCH may be mapped to the first symbol in the S-SSB transmitted by the transmitting UE. For example, upon receiving the S-SSB, the receiving UE may perform an automatic gain control (AGC) operation in the period of the first symbol for the S-SSB.

Figure 7:
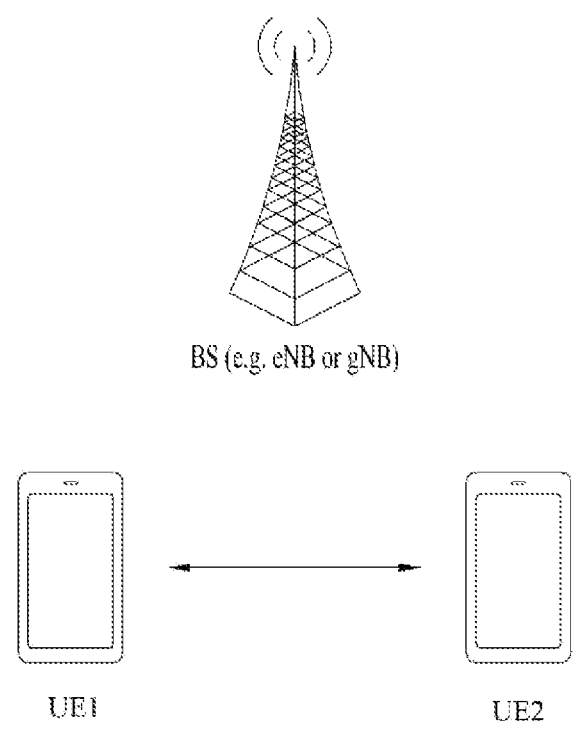
FIG. 7 illustrates UEs performing V2X or SL communication.

FIG. 7 illustrates UEs performing V2X or SL communication.

Referring to FIG. 7, in V2X or SL communication, the term UE may mainly refer to a user's UE. However, when network equipment such as a BS transmits and receives signals according to a communication scheme between UEs, the BS may also be regarded as a kind of UE. For example, UE 1 may be the first device 100, and UE 2 may be the second device 200.

For example, UE 1 may select a resource unit corresponding to a specific resource in a resource pool, which represents a set of resources. Then, UE 1 may transmit an SL signal through the resource unit. For example, UE 2, which is a receiving UE, may receive a configuration of a resource pool in which UE 1 may transmit a signal, and may detect a signal of UE 1 in the resource pool.

Here, when UE 1 is within the connection range of the BS, the BS may inform UE 1 of a resource pool. On the other hand, when the UE 1 is outside the connection range of the BS, another UE may inform UE 1 of the resource pool, or UE 1 may use a preconfigured resource pool.

In general, the resource pool may be composed of a plurality of resource units, and each UE may select one or multiple resource units and transmit an SL signal through the selected units.

Figure 8:
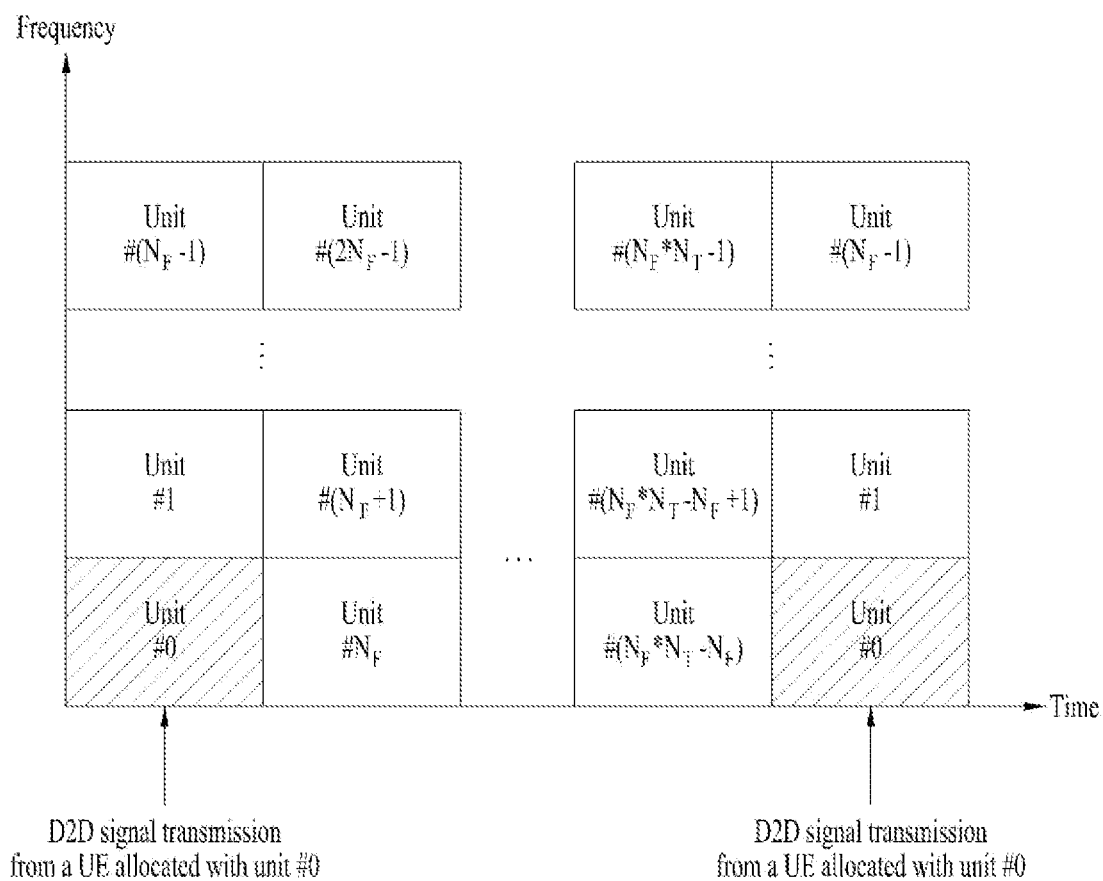
FIG. 8 illustrates resource units for V2X or SL communication.

FIG. 8 illustrates resource units for V2X or SL communication.

Referring to FIG. 8, the frequency resources of a resource pool may be divided into NF sets, and the time resources of the resource pool may be divided into NT sets. Accordingly, a total of NF*NT resource units may be defined in the resource pool. FIG. 8 shows an exemplary case where the resource pool is repeated with a periodicity of NT subframes.

As shown in FIG. 8, one resource unit (e.g., Unit #0) may appear periodically and repeatedly. Alternatively, in order to obtain a diversity effect in the time or frequency dimension, an index of a physical resource unit to which one logical resource unit is mapped may change in a predetermined pattern over time. In this structure of resource units, the resource pool may represent a set of resource units available to a UE which intends to transmit an SL signal.

Resource pools may be subdivided into several types. For example, according to the content in the SL signal transmitted in each resource pool, the resource pools may be divided as follows.

(1) Scheduling assignment (SA) may be a signal including information such as a position of a resource through which a transmitting UE transmits an SL data channel, a modulation and coding scheme (MCS) or multiple input multiple output (MIMO) transmission scheme required for demodulation of other data channels, and timing advance (TA). The SA may be multiplexed with SL data and transmitted through the same resource unit. In this case, an SA resource pool may represent a resource pool in which SA is multiplexed with SL data and transmitted. The SA may be referred to as an SL control channel.

(2) SL data channel (physical sidelink shared channel (PSSCH)) may be a resource pool through which the transmitting UE transmits user data. When the SA and SL data are multiplexed and transmitted together in the same resource unit, only the SL data channel except for the SA information may be transmitted in the resource pool for the SL data channel. In other words, resource elements (REs) used to transmit the SA information in individual resource units in the SA resource pool may still be used to transmit the SL data in the resource pool of the SL data channel. For example, the transmitting UE may map the PSSCH to consecutive PRBs and transmit the same.

(3) The discovery channel may be a resource pool used for the transmitting UE to transmit information such as the ID thereof. Through this channel, the transmitting UE may allow a neighboring UE to discover the transmitting UE.

Even when the SL signals described above have the same content, they may use different resource pools according to the transmission/reception properties of the SL signals. For example, even when the SL data channel or discovery message is the same among the signals, it may be classified into different resource pools according to determination of the SL signal transmission timing (e.g., transmission at the reception time of the synchronization reference signal or transmission by applying a predetermined TA at the reception time), a resource allocation scheme (e.g., the BS designates individual signal transmission resources to individual transmitting UEs or individual transmission UEs select individual signal transmission resources within the resource pool), signal format (e.g., the number of symbols occupied by each SL signal in a subframe, or the number of subframes used for transmission of one SL signal), signal strength from a BS, the strength of transmit power of an SL UE, and the like.

Hereinafter, resource allocation in the SL will be described.

Figure 9:
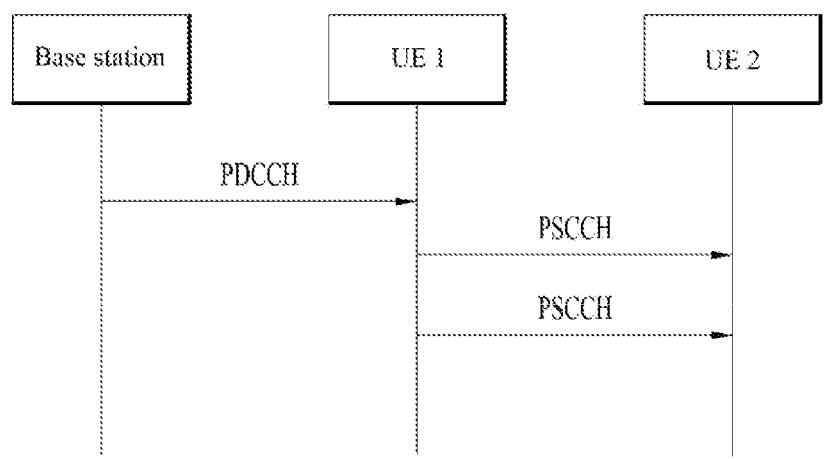
FIG. 9 illustrates a procedure in which UEs perform V2X or SL communication according to a transmission mode.
Figure 9:
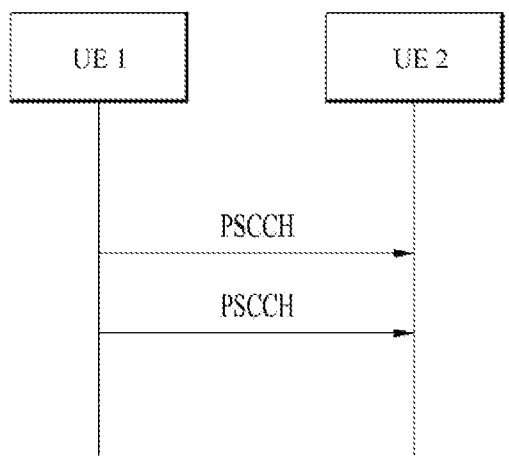

FIG. 9 illustrates a procedure in which UEs perform V2X or SL communication according to a transmission mode. In various embodiments of the present disclosure, the transmission mode may be referred to as a mode or a resource allocation mode. Hereinafter, for simplicity, the transmission mode in LTE may be referred to as an LTE transmission mode, and the transmission mode in NR may be referred to as an NR resource allocation mode.

For example, FIG. 9-(*a*) illustrates a UE operation related to LTE transmission mode 1 or LTE transmission mode 3. Alternatively, for example, FIG. 9-(*a*) illustrates a UE operation related to NR resource allocation mode 1. For example, LTE transmission mode 1 may be applied to general SL communication, and LTE transmission mode 3 may be applied to V2X communication.

For example, FIG. 9-(*b*) illustrates a UE operation related to LTE transmission mode 2 or LTE transmission mode 4. Alternatively, for example, FIG. 9-(*b*) illustrates a UE operation related to NR resource allocation mode 2.

Referring to FIG. 9-(*a*), in LTE transmission mode 1, LTE transmission mode 3 or NR resource allocation mode 1, the BS may schedule an SL resource to be used by the UE for SL transmission. For example, the BS may perform resource scheduling for UE 1 through PDCCH (more specifically, downlink control information (DCI)), and UE 1 may perform V2X or SL communication with UE 2 according to the resource scheduling. For example, UE 1 may transmit sidelink control information (SCI) to UE 2 on a physical sidelink control channel (PSCCH), and then transmit data which is based on the SCI to UE 2 on a physical sidelink shared channel (PSSCH).

For example, in NR resource allocation mode 1, the UE may be provided with or allocated resources for one or more SL transmissions of a transport block (TB) from the BS through a dynamic grant. For example, the BS may provide a resource for transmission of the PSCCH and/or PSSCH to the UE using the dynamic grant. For example, the transmitting UE may report the SL hybrid automatic repeat request (HARQ) feedback received from the receiving UE to the BS. In this case, the PUCCH resource and timing for reporting the SL HARQ feedback to the BS may be determined based on an indication in the PDCCH through the BS is to allocate a resource for SL transmission.

For example, DCI may include a slot offset between DCI reception and the first SL transmission scheduled by the DCI. For example, the minimum gap between the DCI scheduling a SL transmission resource and the first scheduled SL transmission resource may not be shorter than the processing time of the corresponding UE.

For example, in NR resource allocation mode 1, the UE may be periodically provided with or allocated a resource set from the BS for a plurality of SL transmissions through a configured grant. For example, the configured grant may include configured grant type 1 or configured grant type 2. For example, the UE may determine a TB to be transmitted in each occasion indicated by a given configured grant.

For example, the BS may allocate SL resources to the UE on the same carrier, and may allocate SL resources to the UE on different carriers.

For example, an NR BS may control LTE-based SL communication. For example, the NR BS may transmit NR DCI to the UE to schedule an LTE SL resource. In this case, for example, a new RNTI for scrambling the NR DCI may be defined. For example, the UE may include an NR SL module and an LTE SL module.

For example, after the UE including the NR SL module and the LTE SL module receives NR SL DCI from the gNB, the NR SL module may transform the NR SL DCI to LTE DCI type 5A, and the NR SL module may deliver LTE DCI type 5A to the LTE SL module in units of X ms. For example, the LTE SL module may apply activation and/or release to the first LTE subframe Z ms after the LTE SL module receives LTE DCI format 5A from the NR SL module. For example, the X may be dynamically indicated using a field of DCI. For example, the minimum value of X may depend on the UE capability. For example, the UE may report a single value according to the UE capability. For example, X may be a positive number.

Referring to FIG. 9-(b), in LTE transmission mode 2, LTE transmission mode 4, or NR resource allocation mode 2, the UE may determine AN SL resource within the SL resources configured by the B S/network or the preconfigured SL resources. For example, the configured SL resources or the preconfigured SL resources may be a resource pool. For example, the UE may autonomously select or schedule a resource for SL transmission. For example, the UE may autonomously select a resource within the configured resource pool to perform SL communication. For example, the UE may select a resource within a selection window by performing a sensing and resource (re)selection procedure. For example, the sensing may be performed on a per sub-channel basis. In addition, UE 1, which has selected a resource within the resource pool, may transmit SCI to UE 2 through the PSCCH, and then transmit data, which is based on the SCI, to UE 2 through the PSSCH.

For example, a UE may assist in selecting an SL resource for another UE. For example, in NR resource allocation mode 2, the UE may receive a configured grant for SL transmission. For example, in NR resource allocation mode 2, the UE may schedule SL transmission of another UE. For example, in NR resource allocation mode 2, the UE may reserve an SL resource for blind retransmission.

For example, in NR resource allocation mode 2, UE 1 may indicate the priority of SL transmission to UE 2 using the SCI. For example, UE 2 may decode the SCI. UE 2 may perform sensing and/or resource (re)selection based on the priority. For example, the resource (re)selection procedure may include an operation of identifying candidate resources in a resource selection window by UE 2, and an operation of selecting, by UE 2, a resource for (re)transmission from among the identified candidate resources. For example, the resource selection window may be a time interval during which the UE selects the resource for SL transmission. For example, after UE 2 triggers resource (re)selection, the resource selection window may start at T1≥0. The resource selection window may be limited by the remaining packet delay budget of UE 2. For example, in the operation of identifying the candidate resources in the resource selection window by UE 2, a specific resource may be indicated by the SCI received by UE 2 from UE 1. When the L1 SL RSRP measurement value for the specific resource exceeds an SL RSRP threshold, UE 2 may not determine the specific resource as a candidate resource. For example, the SL RSRP threshold may be determined based on the priority of the SL transmission indicated by the SCI received by UE 2 from UE 1 and the priority of the SL transmission on the resource selected by UE 2.

For example, the L1 SL RSRP may be measured based on an SL demodulation reference signal (DMRS). For example, one or more PSSCH DMRS patterns may be configured or preconfigured for each resource pool in the time domain. For example, PDSCH DMRS configuration type 1 and/or type 2 may be the same as or similar to the frequency domain pattern of the PSSCH DMRS. For example, the exact DMRS pattern may be indicated by the SCI. For example, in NR resource allocation mode 2, the transmitting UE may select a specific DMRS pattern from among DMRS patterns configured or preconfigured for the resource pool.

For example, in NR resource allocation mode 2, based on the sensing and resource (re)selection procedure, the transmitting UE may perform initial transmission of a TB without reservation. For example, based on the sensing and resource (re)selection procedure, using the SCI associated with a first TB, the transmitting UE may reserve the SL resource for initial transmission of a second TB.

For example, in NR resource allocation mode 2, the UE may reserve a resource for feedback-based PSSCH retransmission through signaling related to previous transmission of the same TB. For example, the maximum number of SL resources reserved by one transmission including the current transmission may be 2, 3, or 4. For example, the maximum number of SL resources may be the same regardless of whether HARQ feedback is enabled. For example, the maximum number of HARQ (re)transmissions for one TB may be limited by configuration or pre-configuration. For example, the maximum number of HARQ (re)transmissions may be up to 32. For example, when the configuration or pre-configuration is not present, the maximum number of HARQ (re)transmissions may be unspecified. For example, the configuration or pre-configuration may be for the transmitting UE. For example, in NR resource allocation mode 2, HARQ feedback for releasing resources not used by the UE may be supported.

For example, in NR resource allocation mode 2, the UE may indicate to another UE one or more sub-channels and/or slots used by the UE, using the SCI. For example, the UE may indicate to another UE one or more sub-channels and/or slots reserved by the UE for PSSCH (re)transmission, using SCI. For example, the minimum allocation unit of the SL resource may be a slot. For example, the size of the sub-channel may be configured for the UE or may be preconfigured.

Hereinafter, sidelink control information (SCI) will be described.

Control information transmitted by the BS to the UE on the PDCCH may be referred to as downlink control information (DCI), whereas control information transmitted by the UE to another UE on the PSCCH may be referred to as SCI. For example, before decoding the PSCCH, the UE may be aware of the start symbol of the PSCCH and/or the number of symbols of the PSCCH. For example, the SCI may include SL scheduling information. For example, the UE may transmit at least one SCI to another UE to schedule the PSSCH. For example, one or more SCI formats may be defined.

For example, the transmitting UE may transmit the SCI to the receiving UE on the PSCCH. The receiving UE may decode one SCI to receive the PSSCH from the transmitting UE.

For example, the transmitting UE may transmit two consecutive SCIs (e.g., 2-stage SCI) to the receiving UE on the PSCCH and/or the PSSCH. The receiving UE may decode the two consecutive SCIs (e.g., 2-stage SCI) to receive the PSSCH from the transmitting UE. For example, when the SCI configuration fields are divided into two groups in consideration of the (relatively) high SCI payload size, the SCI including a first SCI configuration field group may be referred to as first SCI or 1st SCI, and the SCI including a second SCI configuration field group may be referred to as second SCI or 2nd SCI. For example, the transmitting UE may transmit the first SCI to the receiving UE on the PSCCH. For example, the transmitting UE may transmit the second SCI to the receiving UE on the PSCCH and/or the PSSCH. For example, the second SCI may be transmitted to the receiving UE on the (independent) PSCCH, or may be piggybacked together with data and transmitted on the PSSCH. For example, the two consecutive SCIs may be applied for different transmissions (e.g., unicast, broadcast, or groupcast).

For example, the transmitting UE may transmit some or all of the following information to the receiving UE through SCI. Here, for example, the transmitting UE may transmit some or all of the following information to the receiving UE through the first SCI and/or the second SCI:

- PSSCH and/or PSCCH related resource allocation information, for example, the positions/number of time/frequency resources, resource reservation information (e.g., periodicity); and/or
- SL CSI report request indicator or SL (L1) RSRP (and/or SL (L1) RSRQ and/or SL (L1) RSSI) report request indicator; and/or
- SL CSI transmission indicator (or SL (L1) RSRP (and/or SL (L1) RSRQ and/or SL (L1) RSSI) information transmission indicator) (on PSSCH); and/or
- MCS information; and/or
- transmit power information; and/or
- L1 destination ID information and/or L1 source ID information; and/or
- SL HARQ process ID information; and/or
- new data indicator (NDI) information; and/or
- redundancy version (RV) information; and/or
- (transmission traffic/packet related) QoS information; e.g., priority information; and/or
- SL CSI-RS transmission indicator or information on the number of (transmitted) SL CSI-RS antenna ports;
- Location information about the transmitting UE or location (or distance/area) information about a target receiving UE (to which a request for SL HARQ feedback is made); and/or
- information about a reference signal (e.g., DMRS, etc.) related to decoding and/or channel estimation of data transmitted on the PSSCH, for example, information related to a pattern of a (time-frequency) mapping resource of DMRS, rank information, antenna port index information.

For example, the first SCI may include information related to channel sensing. For example, the receiving UE may decode the second SCI using the PSSCH DMRS. A polar code used for the PDCCH may be applied to the second SCI. For example, in the resource pool, the payload size of the first SCI may be the same for unicast, groupcast and broadcast. After decoding the first SCI, the receiving UE does not need to perform blind decoding of the second SCI. For example, the first SCI may include scheduling information about the second SCI.

In various embodiments of the present disclosure, since the transmitting UE may transmit at least one of SCI, the first SCI, and/or the second SCI to the receiving UE on the PSCCH, the PSCCH may be replaced/substituted with at least one of the SCI, the first SCI, and/or the second SCI. Additionally/alternatively, for example, the SCI may be replaced/substituted with at least one of the PSCCH, the first SCI, and/or the second SCI. Additionally/alternatively, for example, since the transmitting UE may transmit the second SCI to the receiving UE on the PSSCH, the PSSCH may be replaced/substituted with the second SCI.

Hereinafter, synchronization acquisition by an SL UE will be described.

In TDMA and FDMA systems, accurate time and frequency synchronization is essential. Inaccurate time and frequency synchronization may lead to degradation of system performance due to inter-symbol interference (ISI) and inter-carrier interference (ICI). The same is true for V2X. For time/frequency synchronization in V2X, a sidelink synchronization signal (SLSS) may be used in the PHY layer, and master information block-sidelink-V2X (MIB-SL-V2X) may be used in the RLC layer.

Tx/Rx Beam Sweep

In case of using a very high frequency such as mmWave, beamforming may be used to overcome pathloss in general. To use beamforming, a best beam pair should be detected from several beam pairs between a Tx end and an Rx end. Such a process may be referred as beam acquisition or beam tracking from the perspective of the Rx end. Particularly, since mmWave uses analog beamforming, a vehicle may need to perform beam sweeping of switching a beam to a different direction in a different time using an antenna array of the vehicle in the course of beam acquisition or beam tracking.

Figure 10:
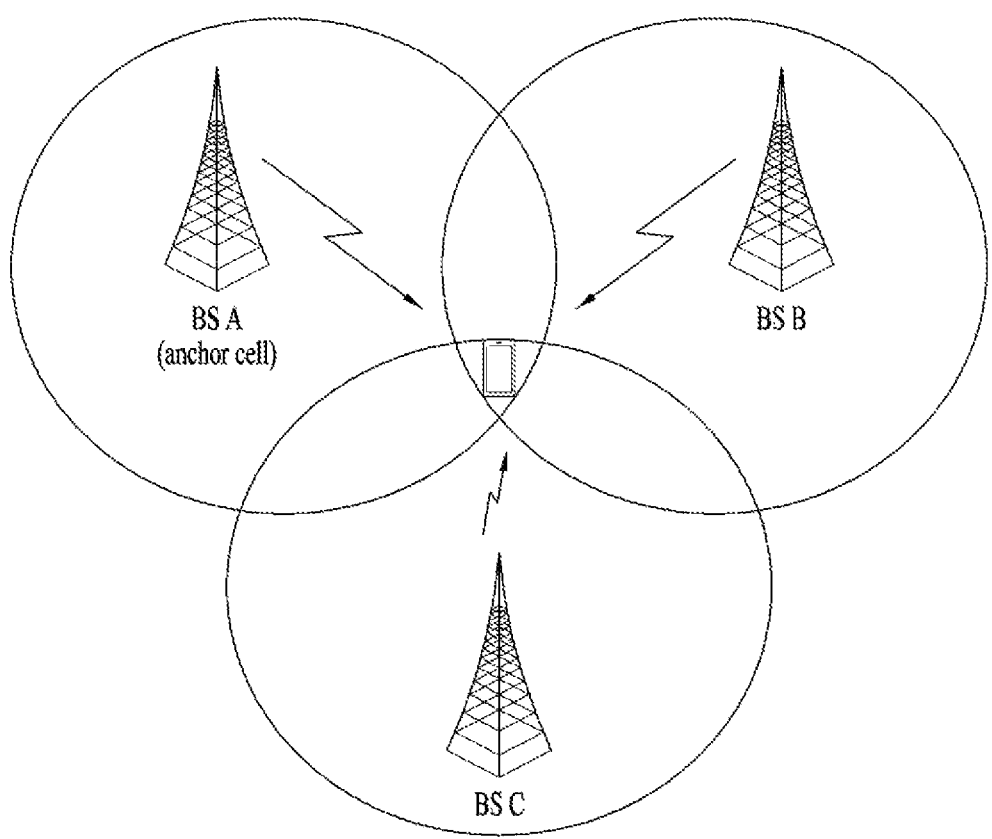
FIG. 10 illustrates a explaining an Observed Time Difference Of Arrival (OTDOA) positioning method.

FIG. 10 is a diagram illustrating an OTDOA positioning method according to an embodiment of the present disclosure.

In the OTDOA positioning method, a UE utilizes measurement timings of DL signals received from multiple TPs including an eNB, an ng-eNB, and a PRS-dedicated TP. The UE measures the timings of the received DL signals using positioning assistance data received from a location server. The location of the UE may be determined based on the measurement results and the geographical coordinates of neighboring TPs.

A UE connected to a gNB may request a measurement gap for OTDOA measurement from a TP. When the UE fails to identify a single frequency network (SFN) for at least one TP in OTDOA assistance data, the UE may use an autonomous gap to acquire the SFN of an OTDOA reference cell before requesting a measurement gap in which a reference signal time difference (RSTD) is measured.

An RSTD may be defined based on a smallest relative time difference between the boundaries of two subframes received from a reference cell and a measurement cell. That is, the RSTD may be calculated as a relative timing difference between a time when the UE receives the start of a subframe from the reference cell and a time when the UE receives the start of a subframe from the measurement cell which is closest to the subframe received from the reference cell. The reference cell may be selected by the UE.

For accurate OTDOA measurement, it is necessary to measure the times of arrival (TOAs) of signals received from three or more geographically distributed TPs or BSs. For example, TOAs for TP 1, TP 2, and TP 3 may be measured, an RSTD for TP 1-TP 2, an RSTD for TP 2-TP 3, and an RSTD for TP 3-TP 1 may be calculated based on the three TOAs, geometric hyperbolas may be determined based on the calculated RSTDs, and a point where these hyperbolas intersect may be estimated as the location of the UE. Accuracy and/or uncertainty may be involved in each TOA measurement, and thus the estimated UE location may be known as a specific range according to the measurement uncertainty.

For example, an RSTD for two TPs may be calculated by Equation 1.

$$RSTDi, 1 = \frac{\sqrt{(x_t - x_i)^2 + (y_t - y_i)^2}}{c} - \frac{\sqrt{(x_t - x_1)^2 + (y_t - y_1)^2}}{c} + (T_i - T_1) + (n_i - n_1)$$

Here, 'c' is the speed of light, {xt, yt} is the (unknown) coordinates of the target UE, {xi, yi} is the coordinates of a (known) TP, and {x1, y1} is the coordinates of a reference TP (or another TP). (Ti–T1) is a transmission time offset between the two TPs, which may be referred to as "real time difference" (RTD), and 'ni' and 'n1' may represent values related to UE TOA measurement errors.

E-CID (Enhanced Cell ID): In cell ID (CID) positioning, the location of a UE may be measured based on geographic information about the serving ng-eNB, serving gNB and/or serving cell of the UE. For example, the geographic information about the serving ng-eNB, the serving gNB, and/or the serving cell may be obtained by paging, registration, or the like.

For E-CID positioning, an additional UE measurement and/or NG-RAN radio resources may be used to improve a UE location estimate in addition to the CID positioning method. In the E-CID positioning method, although some of the same measurement methods as in the measurement control system of the RRC protocol may be used, an additional measurement is generally not performed only for positioning the UE. In other words, a separate measurement configuration or measurement control message may not be provided to position the UE, and the UE may also report a measured value obtained by generally available measurement methods, without expecting that an additional measurement operation only for positioning will be requested.

For example, the serving gNB may implement the E-CID positioning method using an E-UTRA measurement received from the UE.

Exemplary measurement elements that are available for E-CID positioning are given as follows.

UE measurements: E-UTRA RSRP, E-UTRA RSRQ, UE E-UTRA RX-TX time difference, GSM EDGE random access network (GERAN)/WLAN RSSI, UTRAN common pilot channel (CPICH) received signal code power (RSCP), and UTRAN CPICH Ec/Io.

E-UTRAN measurements: ng-eNB RX-TX time difference, timing advance (TADV), and angle of arrival (AoA).

TADVs may be classified into Type 1 and Type 2 as follows.

TADV Type 1=(ng-eNB RX-TX time difference)+(UE E-UTRA RX-TX time difference)

TADV Type 2=ng-eNB RX-TX time difference

On the other hand, an AoA may be used to measure the direction of the UE. The AoA may be defined as an estimated angle of the UE with respect to the location of the UE counterclockwise from a BS/TP. A geographical reference direction may be North. The BS/TP may use a UL signal such as a sounding reference signal (SRS) and/or a DMRS for AoA measurement. As the arrangement of antenna arrays is larger, the measurement accuracy of the AoA is higher. When the antenna arrays are arranged at the same interval, signals received at adjacent antenna elements may have a constant phase change (phase rotation).

UTDOA (Uplink Time Difference of Arrival): UTDOA is a method of determining the location of a UE by estimating the arrival time of an SRS. When the estimated SRS arrival time is calculated, a serving cell may be used as a reference cell to estimate the location of the UE based on the difference in arrival time from another cell (or BS/TP). In order to implement the UTDOA method, an E-SMLC may indicate the serving cell of a target UE to indicate SRS transmission to the target UE. Further, the E-SMLC may provide a configuration such as whether an SRS is periodic/aperiodic, a bandwidth, and frequency/group/sequence hopping.

In a conventional NR system, location information of a UE is measured and acquired through an infrastructure such as a BS or a GPS, which provides absolute location information such as observed time difference of arrival (OT-DoA), uplink time difference of arrival (UTDoA), or multiple roundtrip time (Multi-RTT). In contrast, such a position measurement method of an infrastructure-based UE has a problem in that a normal operation is difficult in an environment in which it is difficult to ensure a line of sight (LOS) between a UE and a BS (or GPS) or the UE is present outside an infrastructure coverage or an infrastructure is not present, such as in a tunnel or a downtown densely populated with skyscrapers.

Thus, research has been actively conducted to measure and acquire relative position information of a UE like a sensor and to apply the information to various services in an environment in which it is difficult to acquire absolute position information of the UE. For example, in future autonomous vehicles (or robots), etc., relative position information between vehicles may be effectively used to prevent collision between vehicles, such as ensuring a safe distance between the vehicles by recognizing existence of nearby vehicles by a driving vehicle.

However, in conventional positioning, a positioning UE acquires signals and information required for relative position measurement of a neighbor UE through a handshaking with the neighbor UE, and as a result, there is a problem in effectively applying the conventional positioning to various collision scenarios that occur between UEs installed on a high-speed vehicle. Thus, there is a need for research for an on-demand relative positioning procedure.

Hereinafter, a method of measuring a relative position of a neighbor UE through sidelink by a positioning UE in an NR-V2X system will be described. A method of measuring a relative position of a neighbor UE may include a method of measuring a distance between a positioning UE and the neighbor UE and a method of measuring a direction in which the neighbor UE is positioned based on the positioning UE. The relative position information of the neighbor UE may be effectively used to prevent collision between UEs by recognizing presence of the neighbor UE and ensuring a safe distance between neighbor UEs like a sensor in an environment in which it is difficult to acquire information on the absolute position of the neighbor UE. Here, the UE may be a mobile device, a V2X module, an IoT device, or the like. As such, relative position information of the UE may be usefully used in various systems such as mmWAVE communication, licensed band communication, unlicensed communication, and ITS band communication.

On-Demand Sidelink Relative Positioning in NR-V2X

On-demand relative positioning may be performed by a UE using sidelink in an NR-V2X system. The on-demand relative positioning may be a method in which a positioning UE requests a neighbor UE to transmit required signals and time of arrival (ToA) related information in order to measure a relative position of the neighbor UE and measures the relative positions of the neighbor UEs based on the signal and information of the neighbor UE that responds thereto. In this case, the relative position of the neighbor UE may be measured using information on a distance between the positioning UE and the neighbor UE and information on a direction (Angle of Arrival or bearing angle) in which the neighbor UE is positioned based on the positioning UE.

In detail, a method for rapidly measuring and collecting information on a distance with a neighbor UE and a direction in which the neighbor UE is positioned by the positioning UE may include 1) a pre-configured PRS scheduling method of a relationship between a request positioning reference signal (PRS) ID transmitted to the neighbor UE from the positioning UE and a response PRS ID group transmitted to the positioning UE from a plurality of neighbor UEs, 2) a method of pre-configuring different response PRS IDs according to a direction in which the neighbor UE is positioned based on the positioning UE in order to prevent collision between response PRSs that occurs by selecting the same response PRS ID in the response PRS ID group by different neighbor UEs, and/or 3) a low-latency on-demand relative positioning procedure (scheduling). Here, the PRS ID (request PRS ID or response PRS ID) may include or provide PRS patterns and/or transmission location information, which are to be defined in the frequency/time domain. In other words, the request PRS ID or the response PRS ID may correspond to the PRS pattern and/or the transmission location. For example, the PRS pattern and/or the transmission location that are distinguished from each other for each request PRS ID or response PRS ID may be pre-mapped.

Prior to a description of the overall on-demand relative positioning procedure, a request PRS transmitted from a positioning UE and a method of transmitting a response PRS in response to the request PRS by a neighbor UE (or a response UE) that receives the request PRS will be described. In particular, in the following proposed pre-configured PRS scheduling, a request related operation and a response related operation between the positioning UE and the neighbor UE (or the response UE) may be predefined and pre-configured. The pre-configured PRS scheduling may not require the conventional procedure of reserving and allocating the request PRS ID and the response PRS ID through handshaking with the positioning UE and the neighbor UE by pre-mapping and configuring the response PRS ID in response to the request PRS ID. The proposed pre-configured PRS scheduling may include the following two steps.

First, a first step may be a process of selecting a response PRS group in response to the request PRS. The first-step process of selecting the response PRS group may be performed by pre-mapping and configuring the response PRS ID group in response to the request PRS ID. In this case, the response PRS ID group may include one or more response PRS IDs. That is, the neighbor UE that receives the request PRS ID from the positioning UE may select one PRS ID (or PRS pattern) from a pre-allocated response PRS ID group (or response PRS patterns) and may transmit a response PRS in response to the request PRS ID. In this case, the positioning UE may check that the response PRS is a response signal to the request PRS of the positioning UE by checking the response PRS ID. As described above, the PRS ID may correspond to or may include the PRS pattern and the transmission location information that are to be defined in the frequency/time domain.

A second step may be a process of selecting one response PRS ID (response PRS pattern) from the response PRS ID group by the neighbor UE or the response UE. The second-step process of selecting one response PRS ID may be performed to minimize a problem in terms of collision between response PRSs that occurs by selecting the same response PRS ID by different neighbor UEs when each of the plurality of neighbor UEs selects one response PRS ID from the response PRS ID group in the first step. In detail, in order to minimize collision between response PRS IDs, the neighbor UE (or the response UE) may select a response PRS ID using AoA information measured through the request PRS received from the positioning UE. That is, in the proposed AoA-based response PRS scheduling method, a response PRS ID (or PRS pattern) to be used according to a direction (or a heading direction or a heading angle) in which the neighbor UE is positioned based on the positioning UE may be pre-allocated and configured under the assumption that the positioning UE and the neighbor UE use the same azimuth coordinates.

Figure 11:
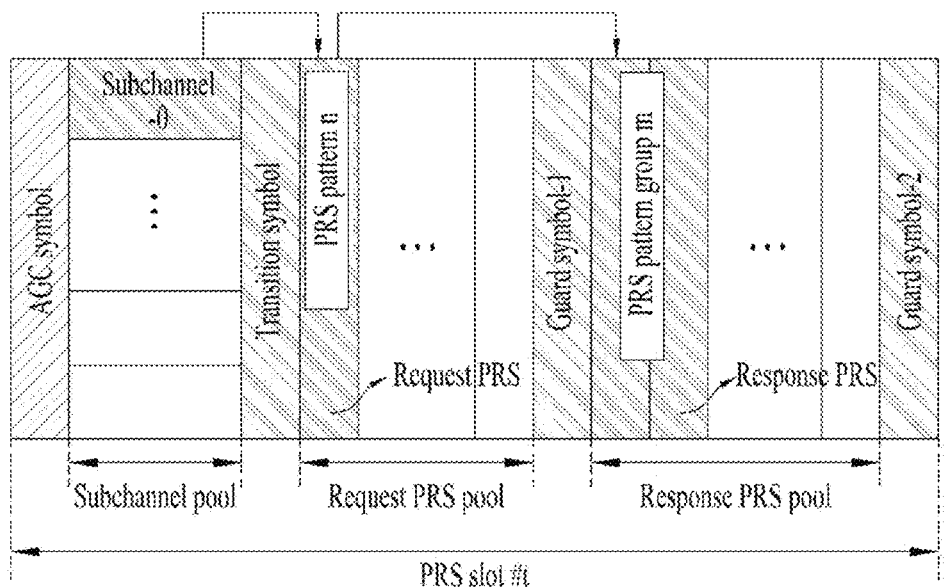
FIGS. 11, 12, and 13 illustrate relative positioning slot structures for transmitting a request PRS and a response PRS for PRS scheduling.
Figure 11:
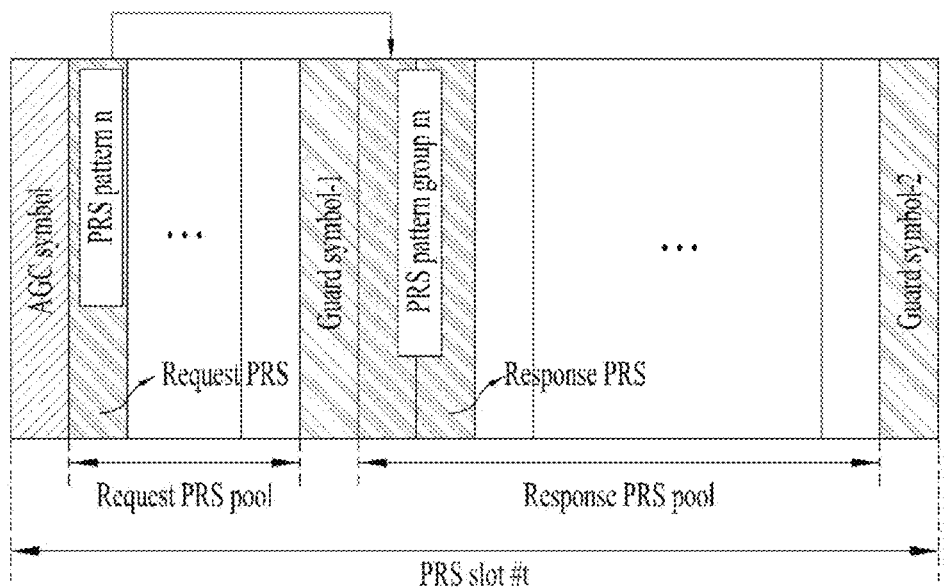
Figure 12:
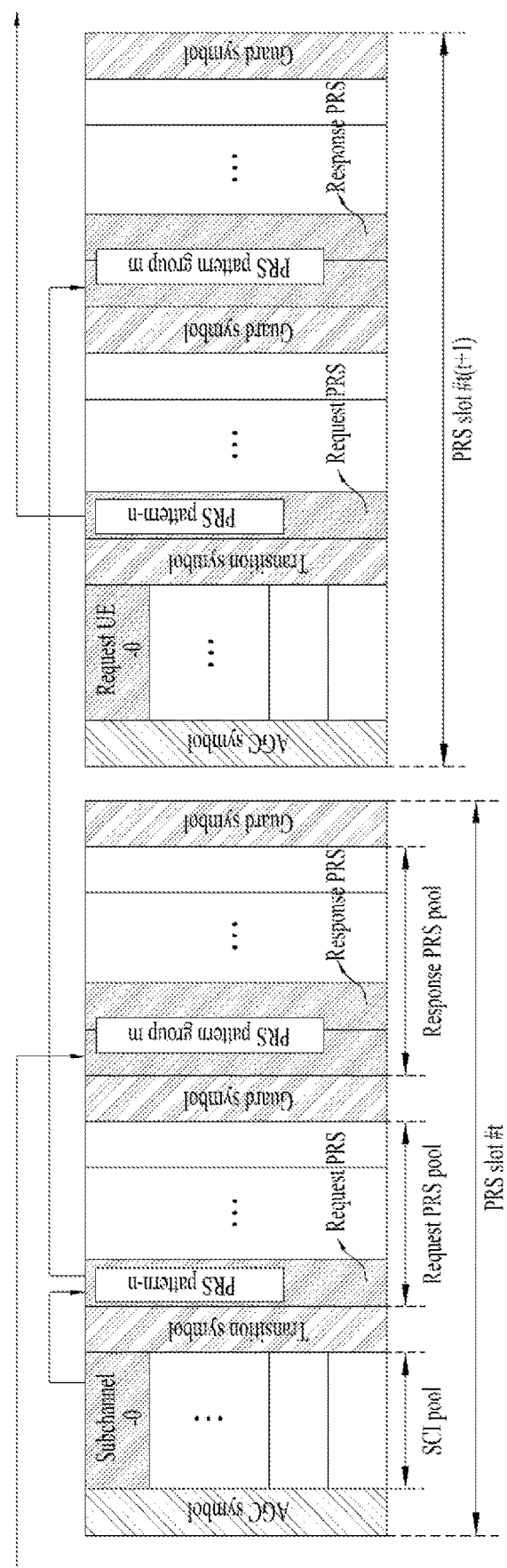
Figure 13:
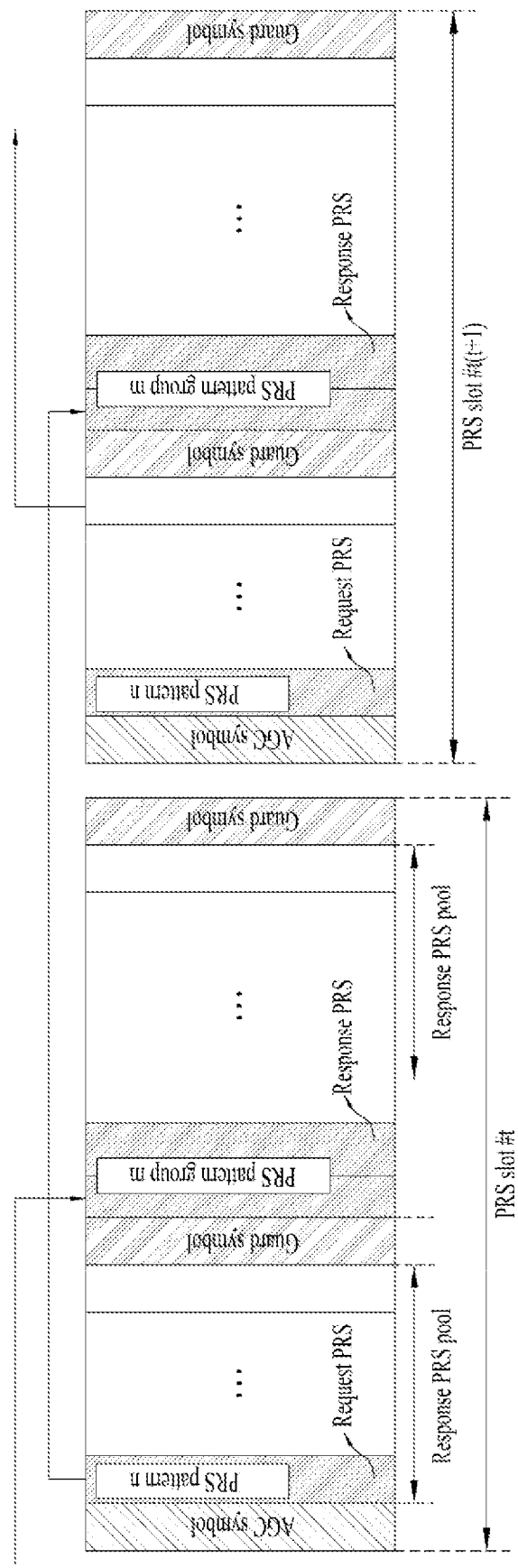

FIGS. 11, 12, and 13 illustrate relative positioning slot structures for transmitting a request PRS and a response PRS for PRS scheduling.

The request PRS and the response PRS for the first-step PRS scheduling may be scheduled based on the slot structure shown in FIGS. 11(a) and 11(b). In addition, the request PRS and the response PRS for the first-step PRS scheduling may be scheduled based on the slot structure shown in FIGS. 11(a) and 11(b) (or shown in FIGS. 12 and/or 13).

In detail, referring to FIGS. 11(a) and 11(b), the positioning UE and the neighbor UE may transmit and receive the request PRS in the same slot and may transmit and receive the response PRS (Slot structure for performing low-latency on-demand relative positioning).

In terms of the positioning UE, the relative positioning slot structure (the first slot structure) of FIG. 11(a) may mainly include 1) an AGC symbol duration for ensuring a time taken to adjust power of an input signal, 2) a subchannel and a subchannel pool duration for transmitting SCI (or control information) such as a heading angle and request PRS scheduling of the positioning UE, 3) a transition symbol duration (a symbol duration for ensuring a time taken until the positioning UE transmits the request PRS through a wide band after transmitting the SCI through a narrow-band subchannel), 4) a request PRS pool duration for transmitting the request PRS by the positioning UE, 5)

a first guard symbol duration for ensuring a time taken until the positioning UE receives the response PRS after transmitting the request PRS, 6) a response PRS pool duration for transmitting the response PRS by the positioning UE, and/or 7) a second guard symbol duration for ensuring a time taken to receive a next slot by the positioning UE.

In the relative positioning slot structure (the second slot structure) of FIG. 11(b), compared with the first slot structure, SCI related to the heading angle, the request PRS scheduling, and the like of the positioning UE is transmitted through different NR-V2X slots and a subchannel pool is not operated, and thus the relative positioning slot structure may not include a transition symbol duration. In addition, second slot structural features may include similar features to the first slot structure.

In relation to the first slot structure and/or the second slot structure, the positioning UE may attempt to reserve an available request PRS ID by sensing SCI transmitted through a PSCCH (or a PSCCH and a PSSCH) and may transmit the request PRS using the finally and successfully reserved request PRS ID. In this case, the PRS ID may include a PRS pattern and/or transmission location information, which are to be defined in the frequency/time domain in a PRS pool. The response PRS ID transmitted by the neighbor UE (or the response UE) may be reserved through a request PRS ID reservation process based on a pre-configured mapping relationship between the aforementioned request PRS ID and the response PRS ID group in response thereto. In other words, when the request PRS ID is reserved, the neighbor UE (or the response UE) may determine the response PRS ID (or the response PRS pattern) based on the pre-configured mapping relationship without a separate reservation process and may transmit the response PRS according to the determined response PRS ID.

For example, the response PRS ID group corresponding to the request PRS ID may be pre-configured and allocated. Referring to FIG. 11, the response PRS ID group in response to the request PRS ID transmitted in a first OFDM symbol of a request PRS pool may be pre-configured and allocated with response PRS IDs transmitted in the first and second symbols of the response PRS pool. Here, the number of PRS IDs to be simultaneously transmitted through the same number of OFDM symbols as the number of OFDM symbols to be used for PRS transmission by the positioning UE or the neighbor UE in the request PRS pool and the response PRS pool and/or the total number of PRS IDs may be predefined or may be determined by a network (a location server, an LMF, and/or a BS) and may be transmitted to the UE.

Referring to FIGS. 12 and 13, the response PRS transmitted by the neighbor UE (or the response UE) may be transmitted in a different PRS slot from the PRS slot in which the request PRS transmitted by the positioning UE is transmitted. The PRS slot structure is configured in consideration of the signal processing capability of the neighbor UE. Although described below, at least one neighbor UE that receives the request PRS needs to measure an AoA from the request PRS and then to select a response PRS ID using the measurement result before transmitting to the response PRS to the positioning UE in response to the request PRS. In this case, when a time taken until the AoA is measured and the response PRS ID is selected after the response PRS ID is received is greater than a pre-configured request PRS transmission time, there may be a problem in that the neighbor UE is not capable of transmitting the response PRS in response to the request PRS. Thus, in order to sufficiently ensure the time until the response PRS ID is selected after the request PRS is received, the PRS slot structure of FIGS. 12 and/or 13, which transmits the request PRS and the response PRS through different PRS slots, may be required.

In detail, the PRS slot structure based on FIG. 12 may be similar to the first slot structure shown in FIG. 11(a) but may be different therefrom in that the request PRS and the response PRS in response thereto are pre-mapped to different PRS slots. Similarly, the PRS slot structure based on FIG. 13 may be similar to the second slot structure shown in FIG. 11(b) but may be different therefrom in that the request PRS and the response PRS in response thereto are pre-mapped to different PRS slots. Hereinafter, the second-step PRS scheduling will be described in detail.

Figure 14:
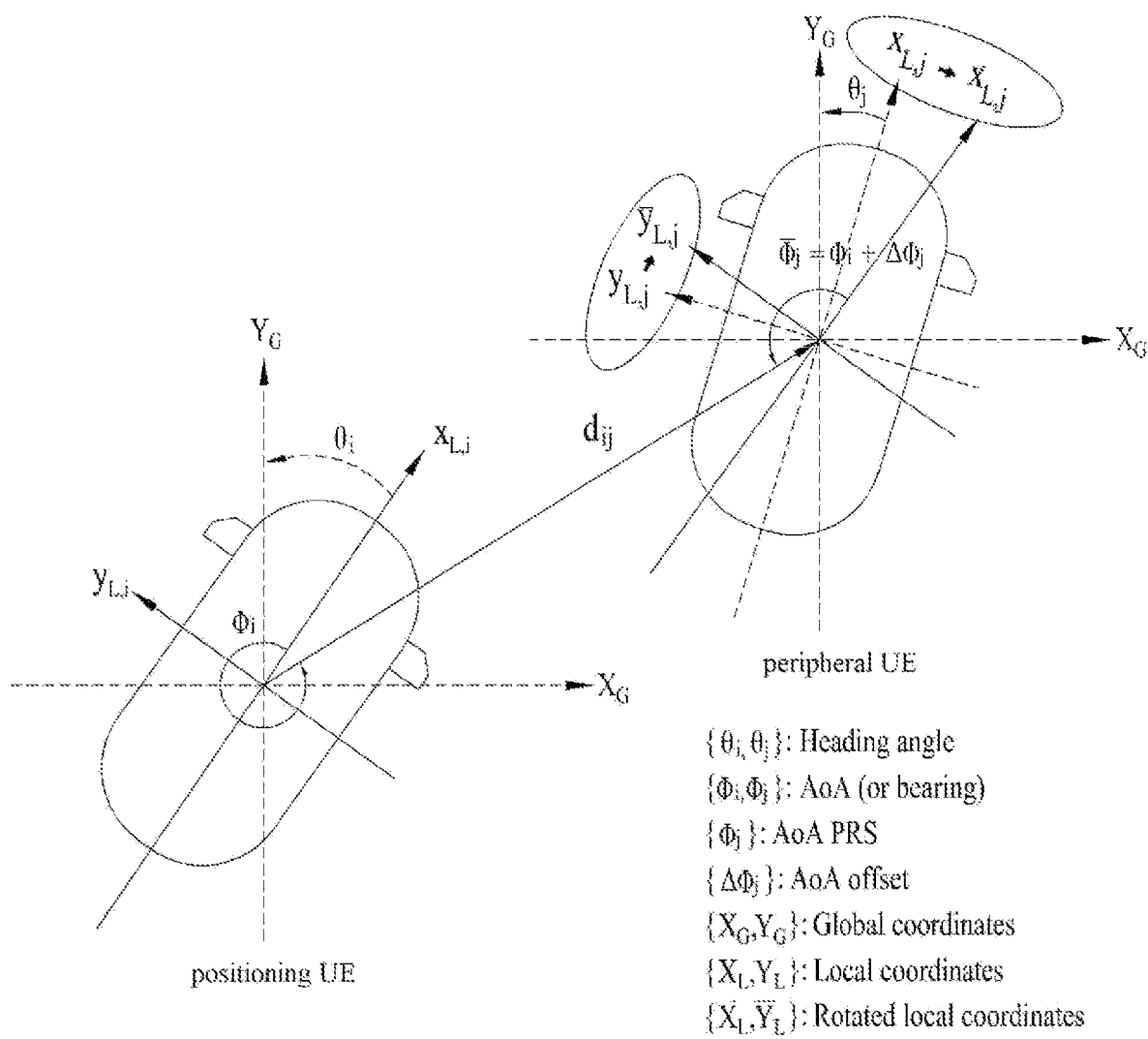
FIG. 14 is a diagram for explaining a method for the second-step PRS scheduling.

FIG. 14 is a diagram for explaining a method for the second-step PRS scheduling.

The second-step PRS scheduling may be a process of selecting or allocating one response PRS ID (or response PRS pattern) in the response PRS ID group (or response PRS pattern group). First, measurement of a heading angle and AoA (or bearing) required to match azimuth coordinates between the positioning UE and the neighbor UE and to pre-allocate the response PRS ID to be used according to a direction in which the neighbor UE is positioned based on the positioning UE will be described. Here, the azimuth coordinates may include local coordinates or global coordinates (or a coordinate system) that are autonomously operated by a vehicle, the local coordinates may be configured and applied differently for respective UEs, and the global coordinates may be applied in the same way to all UEs.

Referring to FIG. 14, the neighbor UE may measure the AoA and the heading angle from a relationship with the positioning UE using the local coordinates and the global coordinates. The neighbor UE may match local coordinates thereof with local coordinates of the positioning UE. In addition, the neighbor UE may match a coordinate system thereof with a coordinate system of the positioning UE.

Here, $\{X_G, Y_G\}$ may refer to global coordinates $\{x,y\}$. $\{x_L, y_L\}$ may refer to local coordinates $\{x,y\}$, and as shown in FIG. 14, local coordinates between the positioning UE and the neighbor UE may or may not be the same. In this case, as for the local coordinates, a side having a longer length of a horizontal length and a vertical length of the positioning UE and/or the neighbor UE may be configured as the x-axis or a side having a shorter length may be configured as the x-axis. In addition, information on a reference for configuring the x-axis or the y-axis may also be pre-configured.

$\{\theta_i, \theta_j\}$ may refer to heading angles that are measured by the positioning UE and the neighbor UE, respectively. Here, the heading angle may be measured counterclockwise as an angle between the x-axis of local coordinates and the y-axis of global coordinates. Alternatively, the heading angle may also be measured clockwise as an angle between the x-axis of the local coordinates and the y-axis of the global coordinates.

$\{\Phi_i, \Phi\}$ may refer to AoAs that are measured by the positioning UE and the neighbor UE, respectively. Here, the AoA may be an incident angle measured counterclockwise based on the x-axis of the local coordinates. Alternatively, the AoA may also be an incident angle measured clockwise based on the x-axis of the local coordinates.

$\varnothing_j$ may be an AoA (or $AoA_{PRS}$, $\varnothing_j = \Phi_j + \Delta\Phi_j$) that is corrected in a process in which the neighbor UE matches local coordinates thereof with local coordinates of the positioning UE and may refer to an incident angle measured counterclockwise based on the x-axis of the local coordinates with respect to the positioning UE. Here, $AoA_{PRS}$ may correspond to a direction in which the neighbor UE is positioned based on the positioning UE and may be used to select the response PRS ID. A method of selecting the response PRS ID using AoA$_{PRS}$ will be described later in detail.

{$x_L$, $y_L$} may refer to local coordinates that are corrected using the heading angle transmitted from the positioning UE by the neighbor UE, and as a result, may have the same local coordinates as the positioning UE.

Figure 15:
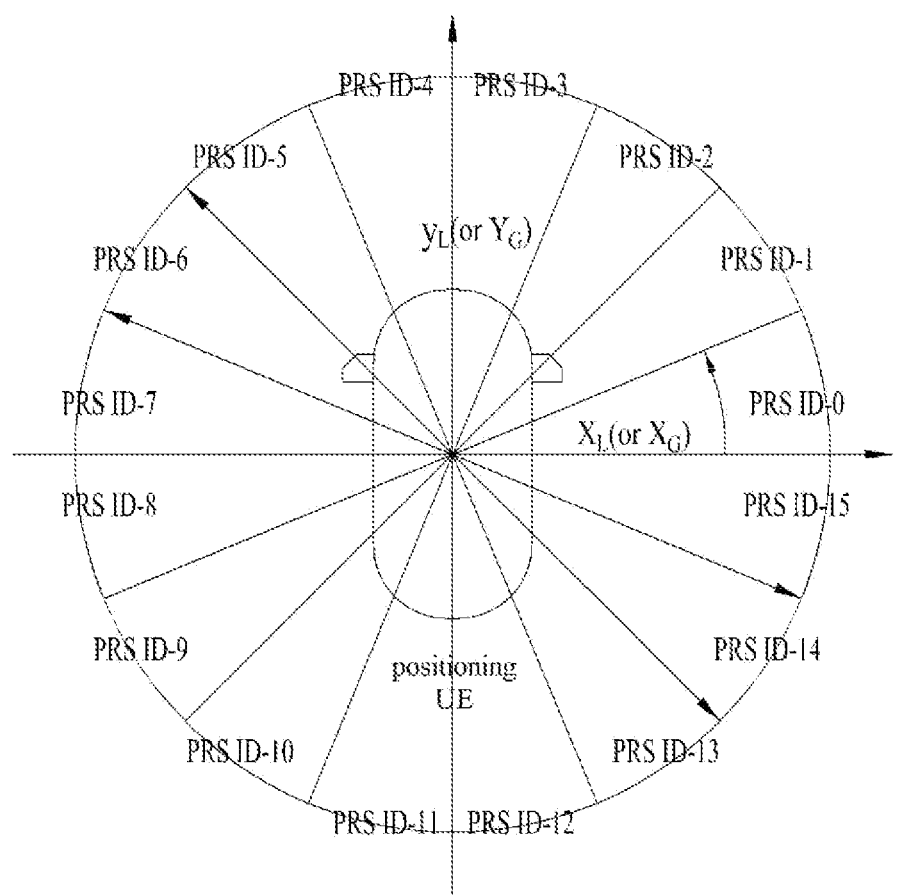
FIG. 15 is a diagram for explaining a method of determining a response PRS ID or a response PRS pattern based on the measured AoA by the neighbor UE.

$\Delta\Phi_j$ may refer to an AoA offset between $\Phi_j$ and $\overline{\emptyset}_j$ and may be calculated using $\Delta\Phi_j = \theta_i - \theta_j$ as shown in FIG. 15.

When the positioning UE and the neighbor UE apply global coordinates, it may be said that the neighbor UE is positioned in a direction of $\Phi_j + \pi/2 - \theta_j$ based on the positioning UE. As such, when a direction in which the neighbor UE is positioned is determined using the global coordinates, the neighbor UE may not require a heading angle of the positioning UE when the AoA is measured.

Hereinafter, a method of determining the response PRS ID or the PRS pattern according to the measured AoA or an AoA to which the AoA offset is applied will be described in detail.

FIG. 15 is a diagram for explaining a method of determining a response PRS ID or a response PRS pattern based on the measured AoA by the neighbor UE.

Referring to FIG. 15, a plurality of response PRS IDs may include 16 different PRS IDs (or PRS patterns) having mutual orthogonality with respect to 16 directions based on the local coordinates or the global coordinates of the positioning UE. In this case, the neighbor UE may determine or select a pre-allocated response PRS ID according to a direction (or the AoA or AoA$_{PRS}$) in which the neighbor UE is positioned based on the positioning UE.

Table 5 shows a correspondence relationship between 16 directions and 16 response PRS IDs as shown in FIG. 15.

TABLE 5

| Response PRS ID | Azimuth (∅), φ = 2π/N (N = 16) |
|---|---|
| PRS ID-0 | 0 ≤ ∅ < φ |
| PRS ID-1 | φ ≤ ∅ < 2φ |
| PRS ID-2 | 2φ ≤ ∅ < 3φ |
| PRS ID-3 | 3φ ≤ ∅ < 4φ |
| PRS ID-4 | 4φ ≤ ∅ < 5φ |
| PRS ID-5 | 5φ ≤ ∅ < 6φ |
| PRS ID-6 | 6φ ≤ ∅ < 7φ |
| PRS ID-7 | 7φ ≤ ∅ < 8φ |
| PRS ID-8 | 8φ ≤ ∅ < 9φ |
| PRS ID-9 | 9φ ≤ ∅ < 10φ |
| PRS ID-10 | 10φ ≤ ∅ < 11φ |
| PRS ID-11 | 11φ ≤ ∅ < 12φ |
| PRS ID-12 | 12φ ≤ ∅ < 13φ |
| PRS ID-13 | 13φ ≤ ∅ < 14φ |
| PRS ID-14 | 14φ ≤ ∅ < 15φ |
| PRS ID-15 | 15φ ≤ ∅ < 16φ |

For example, referring to Table 5 and FIG. 15, when the measured AoA$_{PRS}$ is within 13φ≤∅<14φ based on the positioning UE, the neighbor UE may select a PRS ID-13 and may transmit the request PRS according to a PRS pattern based on the PRS ID-13. A more detailed response PRS ID selection method will be described later in the on-demand relative positioning procedure.

In this case, as the number of PRS IDs increases, the probability of collision between response PRSs that occurs by selecting the same response PRS ID between different neighbor UEs (or between response UEs) may be reduced.

In an environment in which UEs are dense, the probability of selecting the same PRS ID between neighbor UEs may increase. In this case, the positioning UE may make it difficult to distinguish the neighbor UEs in the corresponding azimuth duration. Reflecting this point, the positioning UE may distinguish the neighbor UEs from a multipath signal, or the neighbor UE that is probabilistically closest to the positioning UE may also be estimated based on RSRP information received from each of the neighbor UEs (located within a specific azimuth range) (or RSRP information for the received request PRS).

Hereinafter, a method of performing a low-latency on-demand relative positioning procedure will be described in detail based on the aforementioned method.

STEP-0 may be a process of providing basic operation information required to perform on-demand relative positioning to a positioning UE and a neighbor UE.

It may be considered that the positioning UE and the neighbor UE are present in network (a location server, an LMF, and/or a BS) coverage. In an NR-V2X slot, request PRS pool and response PRS pool structures, a pre-configured mapping relationship between a request PRS ID and a response PRS ID group, and AoA-based response PRS ID configuration information may be NR-V2X system configuration information and may be provided through an MIB/SIB of a PSBCH, and related information thereof may be periodically or aperiodically changed by a network (a location server, an LMF, and/or a BS).

Alternatively, it may be considered that the positioning UE and the neighbor UE are present outside network (a location server, an LMF, and/or a BS) coverage or on-demand relative positioning needs to be performed without help of the network (the location server, the LMF, and/or the BS). In this environment, in an NR-V2X slot, a PRS pool structure, a pre-configured mapping relationship between a request PRS ID and a response PRS ID group, and AoA based response PRS ID configuration information may be pre-configured or may be provided through a storage medium storing pre-configured information.

When the on-demand relative positioning is performed, SCI such as a heading angle, request PRS scheduling, and the like of the positioning UE may be provided to the neighbor UE through a PSCCH (or a PSCCH and/or a PSSCH).

In addition, a transmit/receive antenna operated by the positioning UE and the neighbor UE may have the following features. First, the positioning UE and the neighbor UE may measure an AoA using multiple antennas. The positioning UE and the neighbor UE may apply and change a directional antenna mode and an omni antenna, which improve antenna gain according to transmitting and receiving operations during a positioning process.

STEP-1 may be a process of reserving a request PRS ID (or a request PRS pattern) by the positioning UE for transmission of a request PRS of the positioning UE and transmission of a response PRS of the neighbor UE.

The positioning UE may perform a reservation procedure for transmission of the request PRS. Here, the request PRS reservation procedure may be scheduling or transmission of the request PRS in a request PRS pool of an NR-V2X slot and may be a process for determining a request PRS ID and a request PRS valid time. Reservation by the positioning UE may be performed based sensing and/or contention with another positioning UE. For example, referring to FIG. 11(a) or 12, the positioning UE may sense a subchannel pool of a PRS slot that is transmitted periodically or aperiodically, may determine and reserve a request PRS ID and a request PRS transmission location that are not used or are not intended to be used by another positioning UE, and may not select and reserve a request PRS ID and a request PRS transmission location that are used or are intended to be used by another positioning UE. When a reservation procedure of the request PRS ID is completed, a separate reservation procedure for a response PRS ID group corresponding to the reserved request PRS ID may not be required.

STEP-2 may be a process in which the positioning UE is on standby to transmit a successfully reserved request PRS and to receive a response PRS from a neighbor UE in response. The positioning UE may broadcast the request PRS by applying an omni antenna mode in order to rapidly measure a relative position of a plurality of neighbor UEs (or a plurality of response UEs). The positioning UE may transmit the request PRS to a plurality of neighbor UEs using a reserved request PRS ID and may record a transmission time. After transmitting the request PRS, the positioning UE may be on standby to detect and receive a pre-allocated response PRS ID from the neighbor UE based on a mapping relationship between the request PRS ID and the response PRS ID group.

STEP-3 may be a process in which the neighbor UE receiving the request PRS from the positioning UE transmits the response PRS as an automatic response according to a predefined on-demand relative positioning operation rule.

When a reference signal receive power (RSRP) of the request PRS received from the positioning UE is equal to or greater than a predetermined threshold, the neighbor UE may record a reception time and may measure an AoA of the received request PRS using multiple antennas. The neighbor UE may determine or select the response PRS ID based on the measured AoA.

In detail, the neighbor UE may calculate or determine the $AoA_{PRS}$ based on local coordinates or global coordinates of the measuring UE and the neighbor UE as described above with reference to FIGS. 14 and/or 15. That is, the neighbor UE may perform a process of matching the local coordinates of the neighbor UE with the local coordinates of the positioning UE using the heading angle received from the positioning UE. The neighbor UE may calculate $AoA_{PRS}$ using an offset angle between a heading angle of the neighbor UE and the heading angle received from the positioning UE and an AoA value. In this case, the neighbor UE may determine a corresponding response PRS ID based on the calculated $AoA_{PRS}$. For example, referring to FIG. 15 and Table 5, the neighbor UE may determine an azimuth duration corresponding to an $AoA_{PRS}$ value and may determine a response PRS ID corresponding to the azimuth duration determined based on Table 5.

The neighbor UE may transmit a response PRS using the selected response PRS ID, and in this case, the response PRS may be transmitted by applying a directional antenna mode using an omni antenna mode or the measured AoA. The neighbor UE may record a response PRS transmission time and may measure a TRTD that is a time difference between a reception time of the request PRS and a transmission time of the response PRS. The neighbor UE may measure the RSRP using the received request PRS.

STEP-4 may be a process of detecting the response PRS ID transmitted by the neighbor UE in response to the request PRS transmitted by the positioning UE and measuring the AoA and the RTTD. The positioning UE may receive at least one response PRS by applying an omni antenna mode in order to rapidly measure a relative position of a plurality of neighbor UEs. The positioning UE may record a time at which a response PRS ID is received after being detected from a mapping relationship between the request PRS ID and the response PRS ID group and may measure an RTTD that is a time difference between a transmission time of the request PRS and a reception time of at least one response PRS. The positioning UE may measure an AoA for the detected response PRS using multiple antennas.

STEP-5 may be a process in which the positioning UE measures a relative position of the neighbor UE using a TRTD value measured from the neighbor UE and an RTTD value measured by the positioning UE. The neighbor UE may transmit the measured TRTD, AoA, and RSRP value with the request PRS ID through a PSSCH of an NR-V2X slot. In this case, the positioning UE may receive the TRTD value through the request PRS ID. The positioning UE may measure a distance (or a relative distance) with the neighbor UE using the RTTD and TRTD value and may finally measure a relative position of the UE by applying a trigonometric theorem to a distance, AoA, and RSRP information.

The aforementioned method will be summarized below.

First, a pre-configured PRS scheduling method is a method in which a request PRS ID transmitted from a positioning UE and a response PRS ID group transmitted in response from the neighbor UE are mapped to each other and are pre-configured as an example of a method of simplifying a preceding handshaking process with the neighbor UE in order to acquire signals and information required to measure a relative position of the neighbor UE by the positioning UE. In this case, the PRS ID may include a PRS pattern and transmission location information which are to be defined in the frequency/time domain.

In detail, the positioning UE may pre-reserve and transmit an available request PRS ID in order to perform relative positioning of the neighbor UE, and the neighbor UE that receives the request PRS may select one response PRS ID from a pre-configured response PRS ID group and may transmit a response PRS to the positioning UE in response after analyzing the request PRS ID.

The neighbor UE may select the response PRS ID using AoA information measured through the request PRS received from the positioning UE and may then transmit the response PRS. In this case, in the process of selecting one response PRS ID from the response PRS ID group and transmitting the response PRS by each of a plurality of neighbor UEs, a problem in terms of collision between response PRSs that occurs by selecting the same response PRS ID by different neighbor UEs may be minimized. Here, in detail, pre-configuration of the response PRS ID based on an AoA may be a method of pre-allocating and defining a response PRS ID to be used according to a direction (or an angle) in which the neighbor UE is positioned based on the positioning UE under the assumption that the positioning UE and the neighbor UE use the same azimuth coordinates. For example, the neighbor UE may receive the heading angle and the request PRS from the positioning UE without a handshaking process with the positioning UE, may measure an AoA on the same azimuth coordinates, may determine a direction in which the neighbor UE is positioned based on the positioning UE through measured AoA information, may select a response PRS ID pre-allocated to the corresponding direction, and may transmit the response PRS.

Then, the slot structure for transmitting the request PRS and the response PRS may include a structure (a first PRS slot structure and/or a second PRS slot structure) for transmitting the request PRS and the response PRS by the positioning UE and the neighbor UE, respectively, through the same PRS slot and a structure (refer to FIGS. 12 and 13) for transmitting the request PRS and the response PRS by the positioning UE and the neighbor UE through different PRS slots, respectively (refer to FIGS. 12 and 13).

Hereinafter, the low-latency on-demand relative positioning procedure may be performed using the following method.

The positioning UE may perform a process for pre-reserving an available request PRS ID after sensing an NR-V2X slot or a PRS slot and may transmit the request PRS to neighbor UEs using the finally and successfully reserved request PRS ID. The neighbor UE that receives the request PRS from the positioning UE may select a corresponding response PRS ID based on a pre-configured mapping relationship between the request PRS ID and the response PRS ID group and AoA based response PRS ID pre-configuration information and may then transmit the response PRS ID to the positioning UE.

The positioning UE may calculate or estimate distances with the neighbor UE and a direction in which the neighbor UE is positioned using a Tx-Rx time difference (TRTD), an AoA, and reference signal reception power (RSRP) information, which are received from the neighbor UE, and/or an AoA and an Rx-Tx time difference (RTTD), which are measured using the response PRS and may finally measure a relative position of the neighbor UE. Here, the TRTD may be measured by the neighbor UE and may be defined as a difference between a time at which the request PRS is received and a time at which the response PRS is transmitted in response, and the RTTD may be measured by the positioning UE and may be defined as a difference between a time at which the request PRS is transmitted and a time at which the response PRS is received.

As described above, the proposed method may relate to a method of rapidly performing on-demand relative positioning using sidelink by a UE in an NR-V2X system and may provide the following advantages. First, the proposed PRS scheduling may simplify a process of reserving and allocating the request PRS ID and the response PRS ID through conventional handshaking with the positioning UE and the neighbor UE by pre-mapping the response PRS ID in response to the request PRS ID while predefining and configuring a request related operation and a response related operation between the positioning UE and the neighbor UE. In this case, the on-demand relative positioning may be rapidly performed.

The proposed structure (the first PRS slot structure and/or the second PRS slot structure) for transmitting the request PRS and the response PRS in the same PRS slot may provide an advantage of performing low-latency on-demand relative positioning. The case in which the same response PRS ID is selected when a plurality of neighbor UEs transmit the response PRS may be limited to the minimum by pre-allocating the response PRS ID according to a direction (or an angle) in which the neighbor UE is positioned based on the positioning UE, and accordingly, a problem in terms of collision between response PRSs may be effectively minimized.

Figure 16:
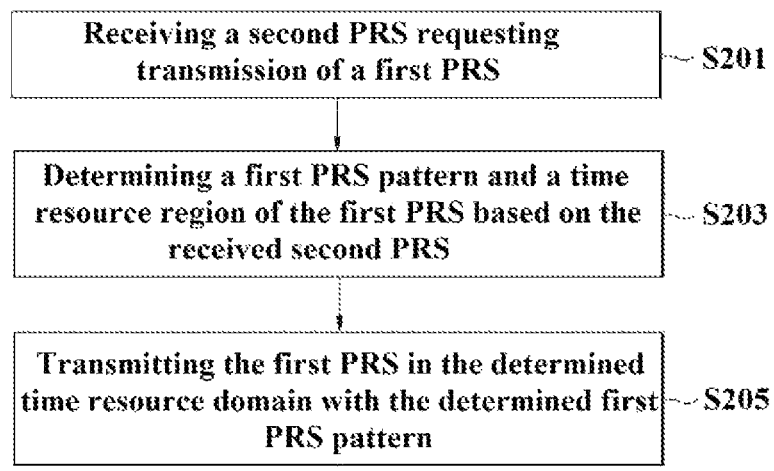
FIG. 16 is a diagram for explaining a method of transmitting a first PRS by a first UE according to a request of a second UE.

FIG. 16 is a diagram for explaining a method of transmitting a first PRS by a first UE according to a request of a second UE.

Referring to FIG. 16, the second UE may receive a signal or a second PRS which requests transmission of the first PRS from the first UE (S201). Here, the first UE may correspond to the aforementioned positioning UE, and the second UE may correspond to the aforementioned response UE or neighbor UE. A PRS or a signal which requests transmission of the PRS may be defined as the second PRS and a PRS in response to the request may be defined as the first PRS.

The first UE may pre-receive sidelink control information (SCI) or control information including allocation information for the second PRS and may receive the second PRS based on the control information.

In detail, the first UE may transmit the first PRS for the relative positioning based on a relative positioning slot for the relative positioning. As shown in FIG. 11, the relative positioning slot may include a subchannel resource pool for transmitting and receiving allocation information or control information for the second PRS, a request PRS resource pool for transmitting and receiving the second PRS as the request PRS, and a response PRS resource pool for transmitting and receiving the first PRS in response to the request. Alternatively, the relative positioning slot may further include a transition OFDM symbol positioned between the subchannel resource pool and the request PRS resource pool. The second UE may transmit the control information in any one of subchannels included in the subchannel resource pool and may transmit the second PRS via a wide band through frequency band transition during a transition OFDM symbol. In addition, the relative positioning slot may include a guard OFDM symbol positioned between the request PRS resource pool and the response PRS resource pool. The second UE may ensure a time for performing an operation for receiving the first PRS after transmitting the second PRS through the guard OFDM symbol.

Alternatively, the response PRS resource pool pre-mapped to the request PRS resource pool may be allocated to the same relative positioning slot as the request PRS resource pool. That is, when the second PRS is received in the first relative positioning slot, the first PRS may be transmitted in the first relative positioning slot.

As shown in FIG. 13 or 14, the response PRS resource pool pre-mapped to the request PRS resource pool may be allocated to a different relative positioning slot from the request PRS resource pool. That is, when the second PRS is received in the first relative positioning slot, the first PRS may be transmitted in a second relative positioning slot that is another slot after the first relative positioning slot.

Then, the first UE may determine a PRS pattern and a time resource region of the first PRS, which need to be responded based on the received second PRS (S203). In detail, the first UE may identify a second PRS pattern (or a second PRS pattern checked based on the acquired second PRS ID) as a PRS pattern for the second PRS and may determine a pre-configured PRS pattern group (including a plurality of PRS patterns) corresponding to the identified second PRS pattern. Alternatively, the first UE may determine a time resource region including the plurality of corresponding PRS patterns based on the second PRS pattern.

The first UE may measure an AoA from the received second PRS and may determine a corresponding PRS pattern or PRS ID based on the measured AoA. The first PRS pattern for the first PRS may be determined based on the PRS pattern or the PRS ID determined according to the measured AoA. For example, the first UE may identify a plurality of pre-configured PRS patterns (or a response PRS ID group) corresponding to the second PRS pattern for the received second PRS and may determine a PRS pattern corresponding to the measured AoA among the plurality of identified PRS patterns as the first PRS pattern.

Alternatively, the first UE may determine a corresponding time resource region based on the received second PRS pattern or the second PRS ID and may determine a PRS pattern corresponding to the measured AoA among the plurality of PRS patterns to be deformed in the determined time resource region as the first PRS pattern.

Here, the measured AoA may be an AoA corrected based on a coordinate system (or local coordinates) of the second UE. That is, the first UE may measure an AoA based on an coordinate system of the first UE and may calculate an AoA value based on a coordinate system of the second UE by applying an AoA offset value determined based on a proceeding direction (or a heading direction) of the second UE and a proceeding direction of the first UE to the measured AoA. In detail, as described with reference to FIG. 14, the first UE may calculate an angle between the heading direction acquired from the second UE (acquired from control information for allocating the second PRS) and a coordinate system of the first UE (the heading direction of the first UE) and may calculate the AoA offset value. The first UE may apply the calculated AoA offset value to the AoA value at which the second PRS is received to calculate an AoA value corrected based on the proceeding direction of the second UE. The first UE may determine a corresponding first PRS pattern based on an AoA value based on the proceeding direction of the second UE.

Then, the first UE may transmit the first PRS in response to the second PRS in the determined time resource region based on the determined first PRS pattern (S205). As described above, the first PRS may be transmitted in the same slot as a slot in which the second PRS is received or may be transmitted in a different slot from the slot in which the second PRS is received. The slot (or the time resource region) in which the first PRS is transmitted may be pre-mapped to the second PRS pattern as described above and information on the mapping relationship may be pre-acquired from the second UE or a network. As described above, whether the second PRS is transmitted in the same slot as the received first PRS may be predetermined by the network or the second UE based on the capability of the first UE.

The first UE may transmit information on a difference (TRTD) between a reception time of the received first PRS and a transmission time of the second PRS with the first PRS to the second UE.

In this case, the second UE may acquire a relative distance and a direction of the first UE based on a difference (RTTD) between a transmission time of the first PRS and a reception time of the second PRS and the TRTD, and a detailed operation thereof will be described in detail with reference to FIG. 17.

Figure 17:
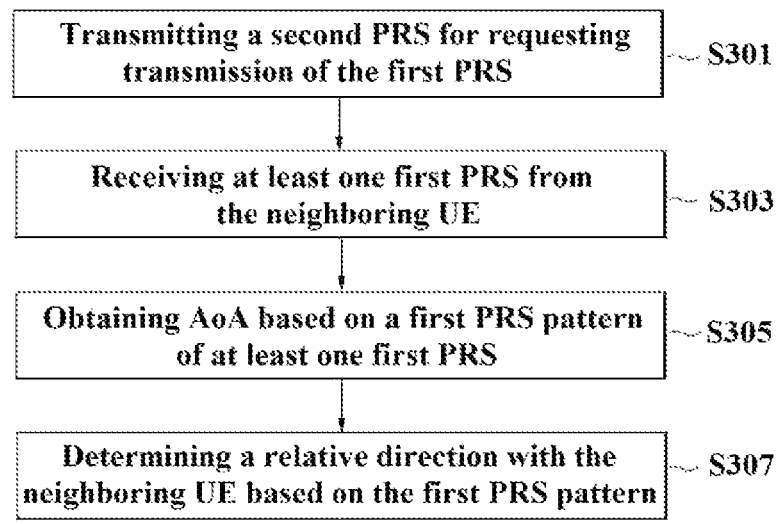
FIG. 17 is a diagram for explaining a method of performing relative positioning based on a first PRS received from a first UE by a second UE.

FIG. 17 is a diagram for explaining a method of performing relative positioning based on a first PRS received from a first UE by a second UE.

Referring to FIG. 17, the second UE may transmit the second PRS for requesting transmission of the first PRS, to neighbor UEs (S301). As described above with reference to FIG. 11, the second UE may transmit control information for scheduling of the second PRS before transmitting the second PRS and may also transmit the second PRS according to the control information.

Then, the second UE may receive at least one first PRS in response to the second PRS from the neighbor UEs (or the first UE) (S303). The second UE may acquire information on a relative distance and a relative direction of the neighbor UE based on the at least one received first PRS.

Then, the second UE may acquire an AoA value related to the neighbor UEs (or the first UE) based on the first PRS pattern of the at least one received first PRS (S305). In other words, the second UE may estimate relative positions at which the neighbor UEs (or the first UE) are positioned based on the first PRS pattern.

The second UE may identify whether the at least one received first PRS is a response PRS transmitted according to a request of the second UE, based on the second PRS pattern. In detail, the first PRS pattern group corresponding to the second PRS pattern is pre-mapped, and thus when the at least one first PRS pattern is a pattern belonging to the first PRS pattern group, the second UE may recognize that the at least one first PRS is the response PRS in response to a request of the second UE.

Alternatively, the second UE may allocate a time resource region in which the first PRS is to be transmitted through the second PRS pattern. That is, as described above, the second PRS pattern and the time resource region in which the first PRS is transmitted may be pre-mapped or pre-configured, and the second UE may determine a time resource region in which the first PRS in response to the second PRS is to be received through the second PRS pattern. In other words, the second UE may determine the time resource region in which the first PRS is to be received based on the second PRS pattern.

Alternatively, the second UE may receive or acquire information on the TRTD (for the second PRS) measured by the neighbor UE supposed to receive the first PRS from the neighbor UE or the first UE.

Then, the second UE may acquire relative direction information with the neighbor UE or the first UE based on the first PRS pattern and may acquire relative distance information with the neighbor UE or the first UE through the RTTD measured based on the first PRS and the received TRTD (S307).

As such, the second UE may transmit the second PRS and may receive the first PRS according to a pre-configured mapping relationship between the first PRS and the second PRS and may differently allocate or configure the first PRS pattern according to an AoA, thereby minimizing collision of response PRSs (or first PRSs) between the neighbor UEs. That is, the second UE may allocate a time/frequency resource of a corresponding first PRS using only transmission of the second PRS according to the second PRS pattern, and may not require transmission of allocation information of a separate response PRS (first PRS) to the neighbor UE. Although the first UE or the neighbor UE does not provide separate direction information, the first UE or the neighbor UE may provide relative direction information thereof to the second UE using only determination of the first PRS pattern.

UTDoA and RTT Positioning for NR-V2X with DAG

Network based UTDoA positioning in an NR system may be operated using a method in which a network requests a UE to transmit an SRS in order for a BS to measure a time of arrival (ToA) through a Uu interface. In addition, the network may request the UE to transmit the SRS to the BS through the Uu interface for performing RTT positioning and the BS may transmit the PRS to the UE. Then, the network based UTDoA positioning may be operated using a method in which the network requests the UE to measure a time at which the PRS is received from the BS and a time at which the SRS is transmitted to the BS (or to measure a difference between a time at which the PRS is received and a time at which the SRS is transmitted) and to report the measured time to the network, receives the measurement information that is finally reported from the UE and information on an SRS reception time from the UE and a PRS transmission time to the PRS, which are measured by the BS (or information on a difference between an SRS reception time and a PRS transmission time) to measure a position of the UE, and then transfers position information to the UE again.

In this case, UTDoA positioning and RTT positioning may mainly consider a single antenna or a merged multi-antenna (co-located multi-input multi-output (MIMO)) for a limited size of mobile UE, such as a smartphone or an IoT device, and may not consider distributed antennas. In contrast, when a vehicle having a larger size than the mobile UE is a UE, a structure configured by distributing and installing an antenna on a roof, front and rear bumpers, or the like of a vehicle in order to provide stable vehicle coverage may be considered. Accordingly, there is a need to develop various positioning methods and a new operating method for improving positioning performance by effectively using distributed antennas in addition to a method of measuring and reporting a time of arrival (ToA) performed in conventional positioning when positioning is performed on a vehicle with distributed antenna groups.

Hereinafter, a network-based uplink time difference of arrival (UTDoA) positioning and round trip time (RTT) positioning method in an NR-V2X system using distributed antennas will be described.

Here, the network may refer to an external device that performs positioning except for a vehicle, such as a location server, an LMF, or a BS. In particular, when the UTDoA positioning is performed, the vehicle with distributed antenna groups may transmit a sounding reference signal (SRS) or an uplink positioning reference signal (PRS) to the BS or may signal related information such as a relative position of each distributed antenna group required to measure a reference position of a vehicle by the BS or the network.

The present disclosure proposes a method of transmitting an SRS to a BS by a vehicle with distributed antenna groups and transmitting a PRS to the vehicle with distributed antenna groups by the BS when RTT positioning is performed and a method of signaling information on a PRS reception time and an SRS transmission time (a difference between transmission and reception times) which are required to measure a relative position of a vehicle by a network and are measured by each distributed antenna group and a relative position of each distributed antenna group for a reference position of a vehicle. Here, the reference position may be a point indicating the position of the vehicle and a predefined arbitrary point of the vehicle, such as the middle of the vehicle or the center of a front bumper of the vehicle. Each distributed antenna group may include one or more antenna elements.

In detail, the present disclosure relates to a network based UTDoA positioning and RTT positioning method in an NR-V2X system using distributed antennas and may have the following main features.

In a position configuring method of the vehicle with distributed antenna groups, positioning of the vehicle with distributed antenna groups may be performed by measuring the reference position of the vehicle. In this case, the referenced position for positioning of the vehicle may be a point indicating the position of the vehicle and a predefined arbitrary point of the vehicle, such as the middle of the vehicle or the center of a front bumper of the vehicle. The reference position of the vehicle may be measured and calculated using the position of a distributed antenna group and a relative position of the distributed antenna group based on the reference position. In this case, each distributed antenna group may include one or more antennas.

A network based UTDoA positioning method may include two modes including an UTDoA positioning mode-1 and an UTDoA positioning mode-2. In the UTDoA positioning mode-1, the vehicle with distributed antenna groups may first provide information on positioning capability of the vehicle to the BS or the network prior to an UTDoA positioning operation. In this case, the positioning capability may mainly include the number of distributed antenna groups of the vehicle and relative location information of each antenna group for the reference position of the vehicle. Then, the BS (or the network) may allocate an SRS resource for transmission of different SRSs corresponding to the number of distributed antenna groups in consideration of the positioning capability of the vehicle. In addition, the BS may allocate a resource for transmission of an heading angle of the vehicle to the vehicle in order to measure information on the relative position of each distributed antenna group, which is changed according to a movement direction of the vehicle, and in this case, the heading angle of the vehicle may be transmitted through a PUSCH and/or a PUCCH. Then, the vehicle with distributed antenna groups may transmit different SRSs for the respective distributed antenna groups through the allocated SRS resource and the BS may measure a ToA for each distributed antenna group using the SRS received from the vehicle. Then, the network may measure the reference position of the vehicle using a ToA value measured by the BS, an absolute position of the BS, which participates in positioning, a relative position of each distributed antenna group for the reference position of the vehicle, and a heading angle, and the vehicle may receive the reference position from the network.

Similarly to the UTDoA positioning mode-1, in the UTDoA positioning mode-2, the vehicle with distributed antenna groups may first provide the information on the positioning capability of the vehicle to the BS or the network prior to the UTDoA positioning operation. In this case, the positioning capability may mainly include the number of distributed antenna groups of the vehicle and order information or location information for identifying each antenna group in the vehicle. Then, the BS (or the network) may allocate an SRS resource for transmission of different SRSs corresponding to the number of distributed antenna groups in consideration of the positioning capability of the vehicle. Then, the vehicle with distributed antenna groups may transmit different SRSs for respective distributed antenna groups through the allocated SRS resource and the BS may measure a ToA using the SRS received from the vehicle. Then, the network may measure the position of each distributed antenna group using a ToA value measured by the BS and an absolute position of the BS, which participates in positioning, and the vehicle may receive the position of each distributed antenna group from the network. Then, the vehicle may finally measure the reference position of the vehicle using the location information of each distributed antenna group received from the network and the relative position of each antenna group measured by the vehicle during transmission of the SRS.

A network based RTT positioning method may include an RTT positioning mode-1 and an RTT positioning mode-2. In the RTT positioning mode-1, the vehicle with distributed antenna groups may first provide information on positioning capability of the vehicle to the BS or the network prior to an RTT positioning operation. In this case, the positioning capability may mainly include the number of distributed antenna groups of the vehicle and relative location information of each antenna group for the reference position of the vehicle. Then, the BS (or the network) may allocate an SRS resource for transmission of different SRSs corresponding to the number of distributed antenna groups in consideration of the positioning capability of the vehicle. In addition, the BS may allocate a resource for transmission of an heading angle of the vehicle to the vehicle in order to measure information on the relative position of each distributed antenna group, which is changed according to a movement direction of the vehicle, and in this case, the heading angle of the vehicle may be transmitted through a PUSCH and/or a PUCCH. Then, the vehicle with distributed antenna groups may transmit different SRSs for the respective distributed antenna groups through the allocated SRS resource and the BS may transmit a PRS to the vehicle with distributed antenna groups. Then, the network may measure the reference position of the vehicle using a PRS reception time and an SRS transmission time (or a difference between transmission and reception times), which are measured in each distributed antenna group of the vehicle, a PRS transmission time measured by the BS and an SRS reception time received from each antenna group of the vehicle (or a difference between transmission and reception times), an absolution position of the BS, which participates in positioning, a relative position of each distributed antenna group for the reference position of the vehicle, and a heading angle, and the vehicle may receive the reference position from the network.

Similarly to the RTT positioning mode-1, in the RTT positioning mode-2, the vehicle with distributed antenna groups may first provide the information on the positioning capability of the vehicle to the BS or the network prior to the RTT positioning operation. In this case, the positioning capability may mainly include the number of distributed antenna groups of the vehicle and order information or location information for identifying each antenna group in the vehicle. Then, the BS (or the network) may allocate an SRS resource for transmission of different SRSs corresponding to the number of distributed antenna groups in consideration of the positioning capability of the vehicle. Then, the vehicle with distributed antenna groups may transmit different SRSs for respective distributed antenna groups through the allocated SRS resource and the BS may transmit a PRS to the vehicle with distributed antenna groups. Then, the network may measure the position of each distributed antenna group using a PRS reception time and an SRS transmission time (or a difference between transmission and reception times), which are measured in each distributed antenna group of the vehicle, a PRS transmission time measured by the BS and an SRS reception time received by each antenna group of the vehicle (or a difference between transmission and reception times), and an absolution position of the BS, which participates in positioning, and the vehicle may receive the position of each distributed antenna group from the network. Then, the vehicle may finally measure the reference position of the vehicle using the location information of each distributed antenna group received from the network and the relative position of each antenna group measured by the vehicle during transmission of the SRS.

Figure 18:
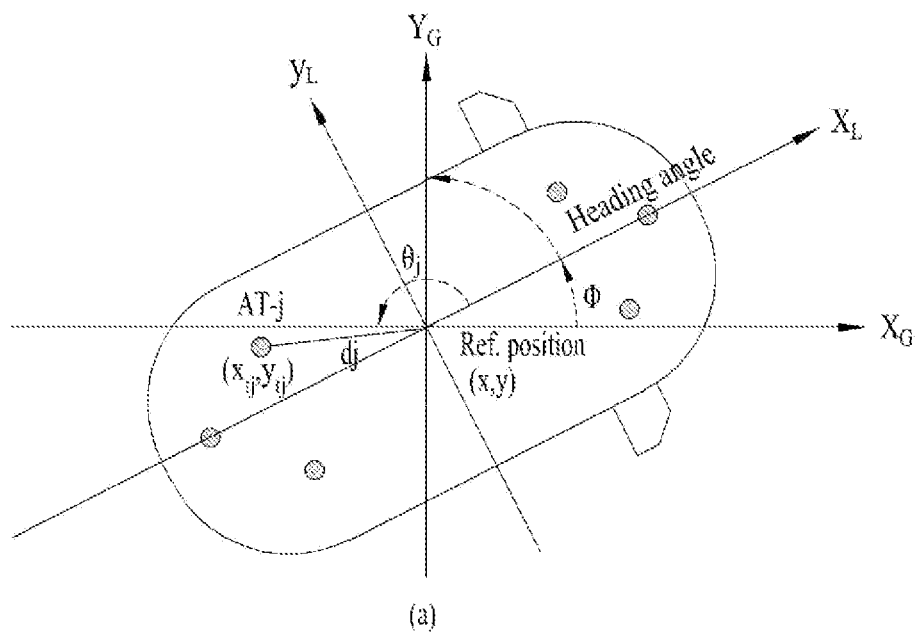
FIG. 18 is a diagram for explaining a predefined reference position of a vehicle when positioning is performed on a vehicle with distributed antenna groups.
Figure 18:
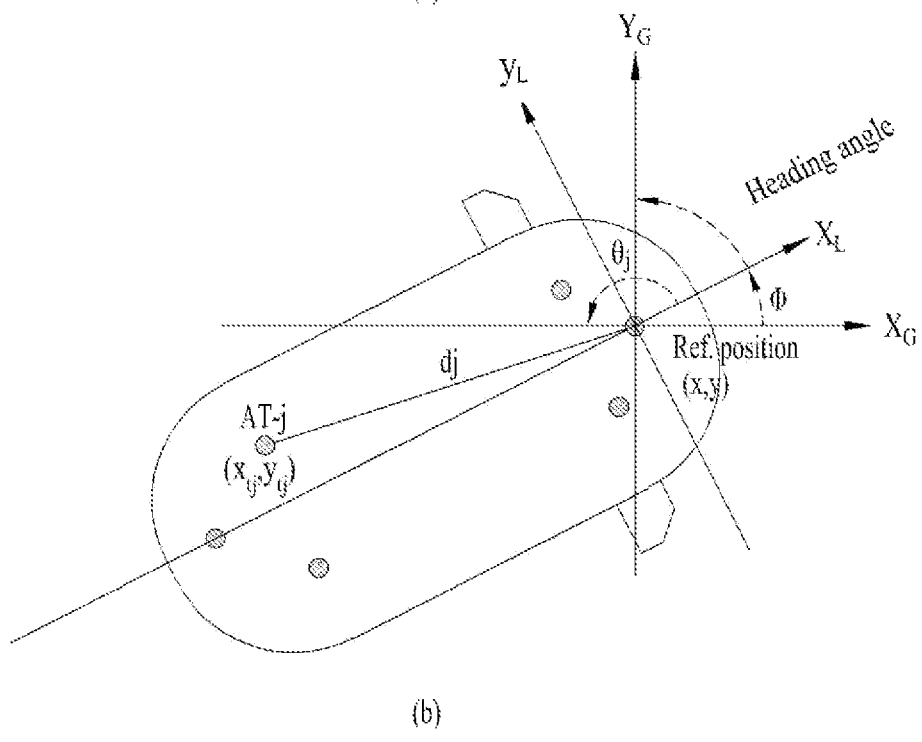

FIG. 18 is a diagram for explaining a predefined reference position of a vehicle when positioning is performed on a vehicle with distributed antenna groups.

The predefined reference position of the vehicle when positioning is performed on the vehicle with distributed antenna groups will be described. The reference position may be a point indicating the position of the vehicle and a predefined arbitrary point of the vehicle, such as the middle of the vehicle or the center of a front bumper of the vehicle, and may be predefined or may be differently configured according to the vehicle. The reference position may indicate the position of one antenna of the distributed antenna group or may indicate a virtual position but not an antenna group position. FIG. 18 illustrates an embodiment of configuration of a reference position for measurement of the position of the vehicle when a plurality of antennas (AT-j, j=1, . . . , N) are distributed and arranged in the vehicle, FIG. 18(a) illustrates the case in which the reference position is configured to the center of (a roof of) the vehicle, and FIG. 18(b) illustrates the case in which the reference position is configured to the middle of a front bumper of the vehicle. Hereinafter, main parameters shown in FIGS. 18(a) and/or 18(b) will be described.

$\{X_G, Y_G\}$ represents global coordinates $\{x, y\}$. $\{x_L, y_L\}$ represents local coordinates $\{x, y\}$, and as shown in FIGS. 16(a) and/or 16(b), the local coordinates between the positioning vehicle and the neighbor vehicle may or may not be the same. In this case, the x axis of the local coordinates may be configured by configuring a longer side of horizontal and vertical sides of the vehicle to the x axis or through other references. The heading angle may be an angle between the x axis of the local coordinates and the y axis of the global coordinates and may be measured counterclockwise. In FIGS. 16(a) and/or 16(b), each distributed antenna represents an antenna group including one or more antenna elements.

Hereinafter, a reference position measurement method using the positioning of each distributed antenna group will be described with reference to FIG. 16, and in this case, position measurement methods in FIGS. 16(a) and/or 16(b) may be the same or similar. A reference position using a position $(x_{tj}, y_{tj})$ of each distributed antenna group from FIG. 16 may be represented based on Equation 2 below.

$$(x,y)=(x_{tj},y_{tj})+(\Delta x_j,\Delta y_1) j=1,\ldots,N \quad \text{[Equation 2]}$$

In Equation 2, (x, y) represents a reference position, and $(\Delta x_j, \Delta y_j)$ represents a relative position of a $j^{th}$ antenna group for a reference position. In this case, $(\Delta x_j, \Delta y_j)$ may be represented by $(\Delta x_j, \Delta y_j)=(d_j \cos(\emptyset+\theta_j), d_j \sin(\emptyset+\theta_j))$ using an angle $\theta_j$ of antenna groups positioned counterclockwise based on local coordinates, a heading angle (e.g., $\pi/2-\emptyset$ in FIG. 18), and a distance $d_j$ between the reference position and the antenna group, and here, $\{\emptyset, \theta_j, d_j\}$ may be predefined or may be measured by the vehicle. As a result, the reference position using the position of a $j^{th}$ antenna of the Equation may be defined based on Equation 3 below.

$$(x,y)=(x_{tj},y_{tj})(d_j \cos(\emptyset+\theta_j),d_j \sin(\emptyset+\theta_j)) \quad \text{[Equation 3]}$$

The UTDoA positioning method is a network based UTDoA positioning method for measuring the reference position of the vehicle using relative location information between the distributed antenna groups described above with reference to FIG. 16.

First, a positioning operation in the UTDoA positioning mode-1 will be described. The UTDoA positioning mode-1 may be a first method of finally measuring the reference position of the vehicle using a ToA for each vehicle antenna group measured by a BS by a network, an absolute position of the BS that participates in positioning, and relative location information of each distributed antenna group for the reference position of the vehicle. Then, the UTDoA positioning mode-1 operation performed by the BS/network, and the vehicle will be sequentially described. Prior to the UTDoA positioning operation, the vehicle may first provide information on the positioning capability of the vehicle to the BS or the network. In this case, the positioning capability may mainly include information related to an identifier indicating that the vehicle is a vehicle with distributed antenna groups, the number of distributed antenna groups of the vehicle, and a relative position of each antenna group for the reference position of the vehicle, may provide a group identification (ID) for distinguishing distributed antenna groups according to a positioning operation method, and may also provide quality information of a local base service (LBS) in which the vehicle participates. In this case, the maximum number of the distributed antenna groups, reported by the vehicle, may be predefined or may be determined by a location server/LMF and/or a BS.

A Method-1 may relate to a method of informing relative location information of each distributed antenna group for a reference position based on local coordinates of the vehicle to a network through report of positioning capability and separately providing information on a heading angle of the vehicle to a BS or a network after the vehicle transmits an SRS. In this case, the relative position of each distributed antenna group pre-informed to the network may be represented by ($d_j \cos \theta_j, d_j \sin \theta_j$) using a distance $d_j$ between the reference position and the antenna group and an angle $\theta_j$ measured counterclockwise (or clockwise) to the position of the antenna group based on the x axis of the local coordinates except for a parameter of the heading angle in FIG. 18 and Equation 3. The relative location information may be transferred after the vehicle calculates ($d_j \cos \theta_j, d_j \sin \theta_j$), or the vehicle may transfer element parameters ($d_j, \theta_j, d_j, \theta_j$), and the network may calculate the relative location information.

A Method-2 may relate to a method in which a vehicle informs only the number of antenna groups by reporting positioning capability and separately provides information related to a relative position of each distributed antenna group for a reference position to a BS or a network after transmitting an SRS. In this case, the relative position of each distributed antenna group, which is separately provided to the network, may be represented by $d_j \cos(\emptyset + \theta_j)$, $d_j \sin(\emptyset + \theta_j)$. The relative location information may be transferred after the vehicle calculates ($d_j \cos(\emptyset + \theta_j)$, $d_j \sin(\emptyset + \theta_j)$), or the vehicle may transfer element parameters ($\emptyset, d_j, \theta_j, d_j, \theta_j$) and the network may calculate the relative location information.

A group identification (ID) used to distinguish between the distributed antenna groups in the vehicle may be operated using two following methods. Here, the group ID may be provided with relative location information of an antenna group, may be provided without relative location information of the antenna group, or may be determined by a network and provided to the vehicle rather than being provided by the vehicle, according to a positioning operation method. A detailed usage method of the group ID will be described in detail below.

ID operation method-1: A group ID may be predefined. For example, this method may relate to a method of pre-applying and using the group ID in consideration of the position of a vehicle at which an antenna group is to be installed, such as a roof of the vehicle, a front bumper of the vehicle, and a front bumper of the vehicle.

ID operation method-2: A group ID may be randomly and temporarily issued by a vehicle, and the number of the randomly generated IDs may be the same as the number of antenna groups of the vehicle, reported to the network. In this case, the randomly generated group ID may be used validly until the network completely measures the reference position of the vehicle or the vehicle receives reference location information from the network.

ID operation method-3: A group ID may be randomly generated by a network and may be issued with an SRS ID for identifying an SRS to the vehicle, and the number of the randomly generated IDs may be the same as the number of antenna groups of the vehicle, reported to the network. In this case, the randomly generated group ID may be used validly until the network completely measures the reference position of the vehicle or the vehicle receives reference location information from the network.

The BS (or the network) may allocate different SRS IDs corresponding to the number of distributed antenna groups and an SRS resource for transmission of an SRS by comprehensively considering the positioning capability of the vehicle and the accuracy of the position of the vehicle, required by the LBS in which the vehicle participates. In this case, the SRS ID may indicate different RS patterns to be distinguished, and an SRS resource may be allocated to have orthogonality and to be distinguished in the time/frequency domain. In addition, the BS may allocate a separate resource for reporting the relative position of the antenna group, which is not included in the (aforementioned) previous report of the positioning capability of the vehicle. In this case, relative position related information of the vehicle antenna group may be transmitted through a PUSCH and/or a PUCCH.

The SRS ID may be predefined or may be transferred to the vehicle with a group ID indicating the position of the antenna group of the vehicle, reported from the vehicle, and as a result, each antenna group of the vehicle may transmit an SRS using an SRS ID indicated by the network. In addition, the vehicle may transmit the relative position of the antenna group in addition to the group ID through a separate resource after transmitting the SRS.

The SRS ID may be transferred to the vehicle in addition to a group ID that is randomly allocated for an antenna group by the network. In this case, an SRS ID used by each antenna group may be randomly determined by the vehicle and may be transmitted. The vehicle may transmit the relative position of the antenna group to the BS or the network with a group ID that is randomly configured by the vehicle through a separate resource after the SRS is transmitted.

The vehicle with distributed antenna groups may transmit different SRSs for respective distributed antenna groups through the allocated SRS resource. In this case, TAs of SRSs transmitted in different antenna groups may be the same or different. The vehicle may transmit the heading angle of the vehicle or the relative position of the antenna group, which is measured at a time at which the SRS is transmitted, through a resource allocated to transmit the relative position related information of the antenna group. The BS may measure ToAs as much as the number of antenna groups using SRSs having different SRS IDs received by different antenna groups of the vehicle. The network may measure the reference position of the vehicle using the ToA value measured by the BS, an absolute position of the BS, which participates in positioning, and a relative position of each distributed antenna group for the reference position of the vehicle, and the vehicle may receive the reference position from the network. In addition, the vehicle may reversely measure the position of each distributed antenna group using the received position and the relative position of each distributed antenna for the reference position.

The UTDoA positioning mode-2 may relate to a second method of finally measuring the reference position by the vehicle. That is, the vehicle may measure the reference position using the position of each antenna group, which is measured and provided in the network, and the relative position of each antenna group, measured by the vehicle.

Hereinafter, operations of the UTDoA positioning mode-2, performed by a BS/network and a vehicle will be sequentially described.

In the UTDoA positioning mode-2, the vehicle may first provide information on the positioning capability of the vehicle to the BS or the network prior to the UTDoA positioning operation similarly to the aforementioned UTDoA positioning mode-1. In this case, the positioning capability may mainly include information related to an identifier indicating that the vehicle is a vehicle with distributed antenna groups and the number of distributed antenna groups of the vehicle, may provide a group ID for distinguishing distributed antenna groups according to a positioning operation method, and may also provide quality information of a local base service (LBS) in which the vehicle participates. In this case, the maximum number of the distributed antenna groups, reported by the vehicle, may be predefined or may be determined by a location server/LMF and/or a BS. The network may determine SRS resources for transmission of different SRSs for the respective antenna groups by comprehensively considering the number of antenna groups provided from the vehicle and information on the quality of the LBS in which the vehicle participates.

In the UTDoA positioning mode-2, the BS (or the network) may allocate different SRS IDs corresponding to the number of distributed antenna groups and an SRS resource for transmission of an SRS by comprehensively considering the positioning capability of the vehicle and the accuracy of the position of the vehicle, required by the LBS in which the vehicle participates similarly to the UTDoA positioning mode-1.

The vehicle with distributed antenna groups may transmit different SRSs for respective distributed antenna groups through the allocated SRS resource. In this case, TAs of SRSs transmitted in different antenna groups may be the same or different. The BS may measure ToAs as much as the number of antenna groups using SRSs having different SRS IDs received by different antenna groups of the vehicle. The network may measure a position of each antenna group using a ToA value measured by the BS and an absolute position of the BS that participates in positioning and may transmit the measured position of the antenna group to the vehicle with the group ID. The vehicle may measure the reference position using the group ID received from the BS or the network, the measured position of the antenna group, and the relative position of each antenna group measured by the vehicle. In this case, the vehicle may provide the measured reference position to the BS or the network periodically/aperiodically.

Location information of each distributed antenna transferred to the vehicle from the network may be used for position measurement of the reference position by the vehicle, and in this case, which antenna of the vehicle is indicated by the location information may be identified through the aforementioned unique ID. Such identification of a position of each antenna may be required to finally measure the reference position using relative location information of each antenna for the reference position by the vehicle.

Hereinafter, the network based RTT positioning method of measuring the reference position of the vehicle using the relative location information between distributed antenna groups described with reference to FIG. 16 will be described. The network based RTT positioning method may include a positioning operation for the RTT positioning mode-1 and a positioning operation for the RTT positioning mode-2.

The RTT positioning mode-1 may be a first method of finally measuring the reference position of the vehicle by the network using a PRS transmission time measured by the BS and a reception time of an SRS received by each antenna group of the vehicle (or a difference between transmission and reception times), a PRS reception time and an SRS transmission time, measured by an antenna group of the vehicle (or a difference between transmission and reception times), an absolute position of a BS that participates in positioning, relative location information of each distributed antenna group for the reference position of the vehicle, and information on a distance between antenna groups. Hereinafter, operations of the RTT positioning mode-1 performed by a BS/network, and a vehicle will be sequentially described.

Similarly to the UTDoA positioning operation, the vehicle may first provide information on positioning capability of the vehicle to the BS or the network prior to the RTT positioning operation. The BS (or the network) may allocate different SRS IDs corresponding to the number of distributed antenna groups and an SRS resource for transmission of an SRS by comprehensively considering the positioning capability of the vehicle and the accuracy of the position of the vehicle, required by the LBS in which the vehicle participates. In this case, the SRS ID may indicate different RS patterns to be distinguished, and an SRS resource may be allocated to have orthogonality and to be distinguished in the time/frequency domain. In addition, the BS may allocate a separate resource for reporting the relative position of the antenna group, which is not included in the (aforementioned) previous report of the positioning capability of the vehicle. In this case, the relative position related information of the vehicle antenna group may be transmitted through a PUSCH and/or a PUCCH. The BS may provide PRS ID information that is to be measured and to be then reported to the vehicle, and transmitted PRS IDs may be the same or different for respective antenna groups. The vehicle with distributed antenna groups may transmit different SRSs for the respective distributed antenna groups through the allocated SRS resource.

In this case, TAs of the SRSs transmitted in different antenna groups may be the same or different. The BS may transmit the same PRS or different PRSs to the respective antenna groups of the vehicle. The BS may record a transmission time of a PRS and a reception time of an SRS received by each antenna group of the vehicle and may transfer the recorded information to the network or may measure information on a difference between transmission and reception times of the PRS and an SRS for each antenna group and may transfer the information to the network.

The vehicle may record a PRS reception time measured by each antenna group and an SRS transmission time in each antenna group to the BS or the network or may transfer information on a difference between transmission and reception times of the SRS and the PRS, measured in the respective antenna groups, to the network. In this case, a method of transferring/transmitting the transmission and reception times of the SRS and the PRS measured in the respective antenna groups and the information on the difference between the transmission and reception times to the network from the vehicle may be changed according to a TA operation between the BS and each antenna group. When TAs between the BS and each antenna group are the same, entire information measured in the vehicle may be transmitted to the network or the BS in the form of one predefined resource and data combined through an antenna. When the TAs between the BS and each antenna group are different, information measured in each antenna group may be transmitted to the network or the BS in the form of distributed data through different resources and antennas. Irrespective of the TAs between the BS and each antenna group, entire information measured in the vehicle may be transmitted to the network or the BS in the form of combined data through one predefined resource and antenna.

The vehicle may transmit a heading angle of the vehicle or a relative position of the antenna group through a resource allocated for transmission of the relative position related information of the antenna group.

The network may measure the reference position of the vehicle using a ToA value measured by the BS, an absolute position of the BS that participates in positioning, and a relative position of each distributed antenna group for the reference position of the vehicle, and the vehicle may receive the reference position from the network. The vehicle may reversely measure the position of each distributed antenna group using the received position and the relative position of each distributed antenna for the reference position.

The network may measure the reference position of the vehicle using a PRS transmission time measured by the BS and a reception time of an SRS received by each antenna group of the vehicle (or a difference between transmission and reception times), a PRS reception time and an SRS transmission time, measured by an antenna group of the vehicle (or a difference between transmission and reception times), an absolute position of a BS that participates in positioning, and a relative position of each distributed antenna group for the reference position of the vehicle, and the vehicle may receive the reference position from the network. The vehicle may reversely measure the position of each distributed antenna group using the received reference position and the relative position of each distributed antenna for the reference position.

The RTT positioning mode-2 may be a second method of finally measuring the reference position by the vehicle. That is, the vehicle may measure the reference position using the position of each antenna group, measured and provided by the network, and the relative position of each antenna group, measured by the vehicle. Hereinafter, operations of the RTT positioning mode-2 performed by a BS/network, and a vehicle will be sequentially described.

Similarly to the RTT positioning mode-1, in the RTT positioning mode-2, the vehicle may first provide information on the positioning capability of the vehicle to the BS or the network prior to an RTT positioning operation. In this case, the positioning capability may mainly include information related to an identifier indicating that the vehicle is a vehicle with distributed antenna groups and the number of distributed antenna groups of the vehicle, may provide a group ID for distinguishing distributed antenna groups according to a positioning operation method, and may also provide quality information of an LBS in which the vehicle participates. In this case, the maximum number of the distributed antenna groups, reported by the vehicle, may be predefined or may be determined by a location server/LMF and/or a BS. The network may determine SRS resources for transmission of different SRSs for the respective antenna groups by comprehensively considering the number of antenna groups provided from the vehicle and information on the quality of the LBS in which the vehicle participates.

The BS (or the network) may allocate different SRS IDs corresponding to the number of distributed antenna groups and an SRS resource for transmission of an SRS by comprehensively considering the positioning capability of the vehicle and the accuracy of the position of the vehicle, required by the LBS in which the vehicle participates.

The vehicle with distributed antenna groups may transmit different SRSs for respective distributed antenna groups through the allocated SRS resource. In this case, TAs of SRSs transmitted in different antenna groups may be the same or different.

The BS may transmit the same or different PRSs to the respective antenna groups of the vehicle. Alternatively, the BS may record a transmission time of a PRS and a reception time of an SRS received by each antenna group of the vehicle and may transfer the recorded information to the network or may measure information on a difference between transmission and reception times of the PRS and an SRS for each antenna group and may transfer the information to the network.

The vehicle may record a PRS reception time measured by each antenna group and an SRS transmission time in each antenna group to the BS or the network or may transfer information on a difference between transmission and reception times of the SRS and the PRS, measured in the respective antenna groups, to the network. In this case, a method of transferring/transmitting the transmission and reception times of the SRS and the PRS measured in the respective antenna groups and the information on the difference between the transmission and reception times to the network from the vehicle may be changed according to a TA operation between the BS and each antenna group, similarly to the RTT positioning mode-1.

The network may measure the position of each antenna group using the PRS transmission time measured by the BS and the SRS reception time received by each antenna group of the vehicle (or a difference between transmission and reception times), the PRS reception time and the SRS transmission time measured by the antenna group of the vehicle (or a difference between transmission and reception times), and an absolute position of the BS that participates in positioning, and may transmit the position of the antenna group measured with the group ID to the vehicle.

The vehicle may measure the reference position using the group ID received from the BS or the network, the measured position of the antenna group, and the relative position of each antenna group measured by the vehicle. In this case, the vehicle may provide the measured reference position to the BS or the network periodically/aperiodically.

Location information of each distributed antenna transferred to the vehicle from the network may be used for position measurement of the reference position by the vehicle, and in this case, which antenna of the vehicle is indicated by the location information may be identified through the aforementioned unique ID. Such identification of a position of each antenna may be required to finally measure the reference position using relative location information of each antenna for the reference position by the vehicle.

The aforementioned network based UTDoA positioning and RTT positioning method in an NR-V2X system using distributed antennas may have the following advantages. The reference position measurement method of various vehicles using a distributed antenna group of a vehicle proposed according to the present disclosure may be a method that is not conventionally proposed and may be flexibly applied according to a position operation method of a network.

The proposed method of measuring a reference position by a network may largely improve the accuracy of measuring the reference position of the vehicle by comprehensively using relative location information of the distributed antenna group provided from the vehicle by the network and ToA information measured by each antenna group. The method of measuring the reference position by the vehicle may be a method that uses the position of each distributed antenna group provided from the network by the vehicle and the relative location information of the distributed antenna group by the vehicle and may advantageously distribute positioning related signaling information transmitted through uplink and downlink between a network and a vehicle compared with the method of measuring the reference position by the network.

Communication System Example to which the Present Disclosure is Applied

Although not limited thereto, various descriptions, functions, procedures, proposals, methods, and/or operational flow charts of the present disclosure disclosed in this document may be applied to various fields requiring wireless communication/connection (5G) between devices.

Hereinafter, it will be illustrated in more detail with reference to the drawings. In the following drawings/description, the same reference numerals may exemplify the same or corresponding hardware blocks, software blocks, or functional blocks, unless otherwise indicated.

Figure 19:
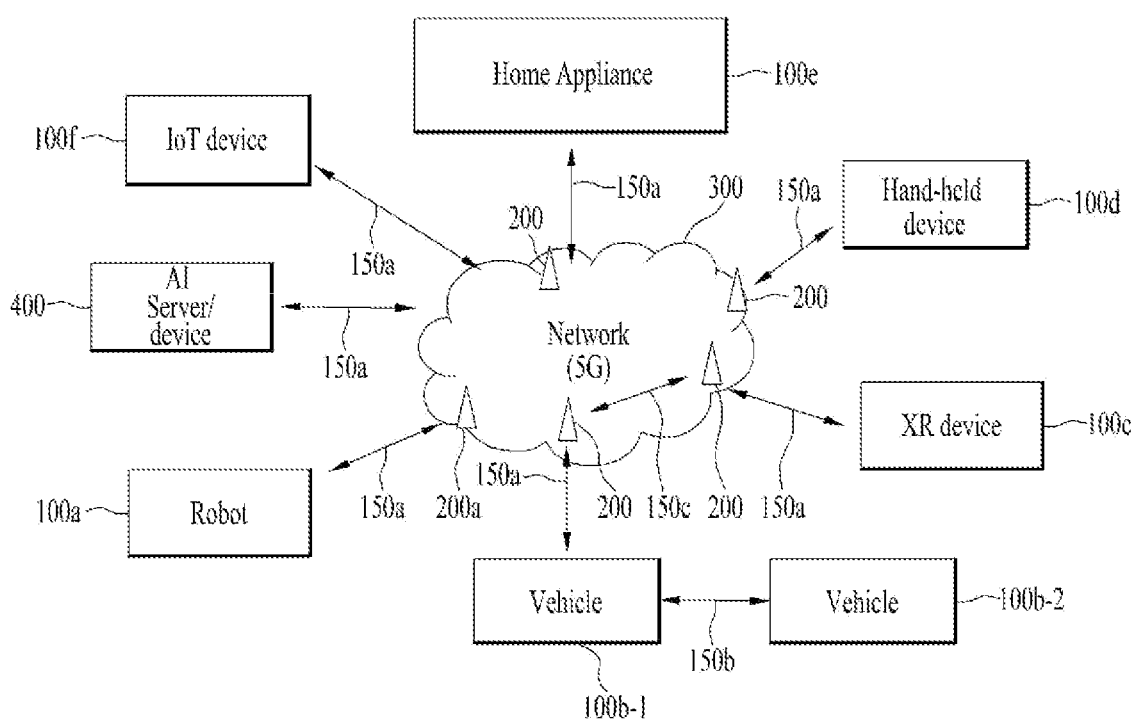
FIG. 19 illustrates a communication system applied to the present disclosure.

FIG. 19 illustrates a communication system applied to the present disclosure.

Referring to FIG. 19, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul(IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Examples of Wireless Devices to which the Present Disclosure is Applied

Figure 20:
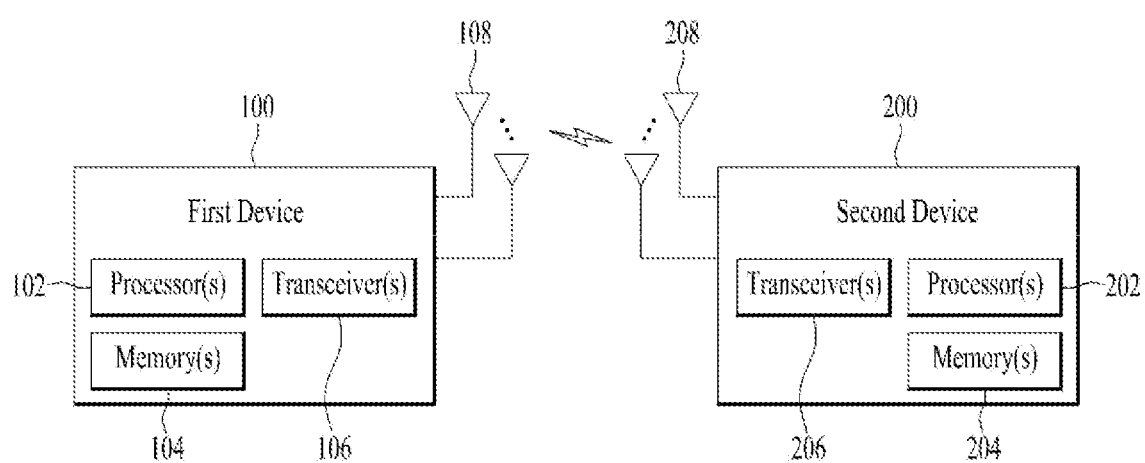
FIG. 20 illustrates wireless devices applicable to the present disclosure.

FIG. 20 illustrates a wireless device applicable to the present disclosure.

Referring to FIG. 20, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 19.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information acquired by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document.

Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

In detail, the UE may include the processor 102 and the memory 104 that are connected to the RF transceiver. The memory 104 may include at least one program for performing operations related to the embodiments described with reference to FIGS. 10 to 14.

The processor 102 may control the RF transceiver to receive a second PRS that requests transmission of the first PRS from the second UE, may measure an angle of arrival (AoA) based on the second PRS, may determine a first PRS pattern of the first PRS based on the AoA, may determine a time resource region in which transmission of the first PRS is requested based on a second PRS pattern of the second PRS, and may control the RF transceiver to transmit the first PRS based on the first PRS pattern and the determined time resource region. The processor may transmit the first PRS based on the operations shown in FIGS. 11 to 18.

In addition, a chip set including the processor 102 and the memory 104 may be configured. In this case, the chip set may include at least one processor and at least one memory operatively connected to the at least one processor and configured to perform an operation by the at least one processor, may receive a second PRS that requests transmission of the first PRS from the second UE, measures an angle of arrival (AoA) based on the second PRS, may determine a first PRS pattern of the first PRS based on the AoA, may determine a time resource region in which transmission of the first PRS is requested based on a second PRS pattern of the second PRS, and may transmit the first PRS based on the first PRS pattern and the determined time resource region. In addition, the operation may be based on a program contained in the memory 104, and operations of transmitting the first PRS may be performed according to the embodiments described with reference to FIGS. 11 to 18.

In addition, a computer-readable recording medium containing at least one computer program for causing at least one processor to perform an operations may be provided, and the operation may include receiving a second PRS that requests transmission of the first PRS from the second UE, measuring an angle of arrival (AoA) based on the second PRS, determining a first PRS pattern of the first PRS based on the AoA, determining a time resource region in which transmission of the first PRS is requested based on a second PRS pattern of the second PRS, and transmitting the first PRS based on the first PRS pattern and the determined time resource region. In addition, the operation may be based on a program contained in the memory 104, and operations of transmitting the first PRS may be performed according to the embodiments described with reference to FIGS. 11 to 18.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information acquired by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

The processor may control the RF transceiver to transmit a second PRS that requests transmission of a first positioning reference signal (PRS) and to receive a first PRS in response to the second PRS and may acquire information related to an angle of arrival (AoA) based on a first PRS pattern of the first PRS, and in this case, the first PRS may be received in a time resource region determined based on a second PRS pattern of the second PRS. In addition, the operation may be based on a program contained in the memory 204, and operations of transmitting the first PRS may be performed according to the embodiments described with reference to FIGS. 11 to 18.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Examples of Wireless Devices to which the Present Disclosure is Applied

Figure 21:
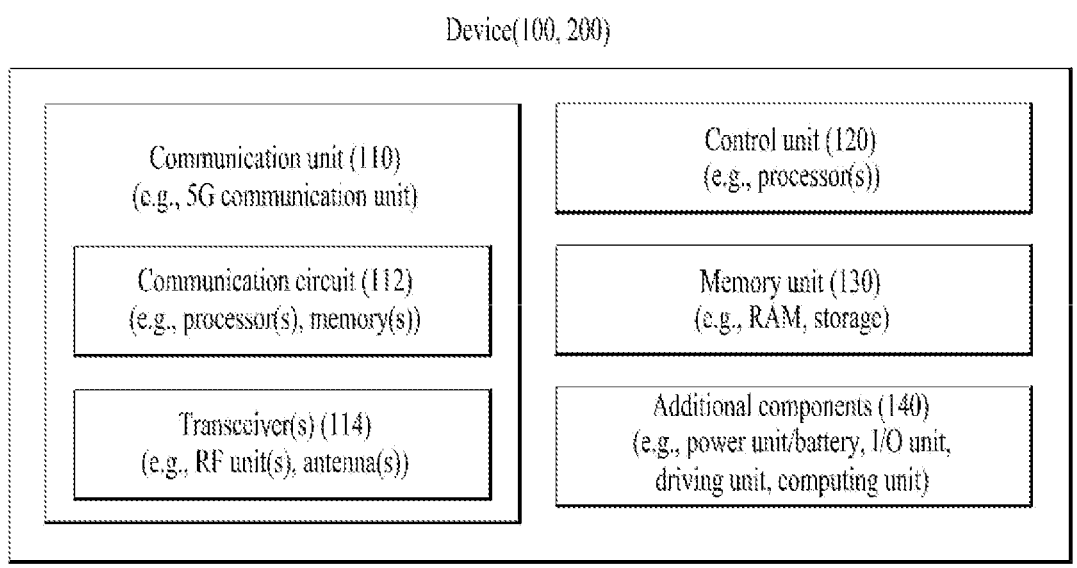
FIG. 21 illustrates another example of a wireless device to which the present disclosure is applied. The wireless device may be implemented in various forms according to use-examples/services.

FIG. 21 illustrates another example of a wireless device applied to the present disclosure. The wireless device may be implemented in various forms according to a use-case/service (refer to FIG. 19)

Referring to FIG. 21, wireless devices 100 and 200 may correspond to the wireless devices 100 and 200 of FIG. 20 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 20. For example, the transceiver(s) 114 may include the one or more transceivers 106 and 206 and/or the one or more antennas 108 and 208 of FIG. 20. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 19), the vehicles (100*b*-1 and 100*b*-2 of FIG. 19), the XR device (100*c* of FIG. 19), the hand-held device (100*d* of FIG. 19), the home appliance (100*e* of FIG. 19), the IoT device (100*f* of FIG. 19), a digital broadcast terminal, a hologram device, a public safety device, an MTC device, a medicine device, a fintech device (or a finance device), a security device, a climate/environment device, the AI server/device (400 of FIG. 19), the BSs (200 of FIG. 19), a network node, etc. The wireless device may be used in a mobile or fixed place according to a use-example/service.

In FIG. 21, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Figure 22:
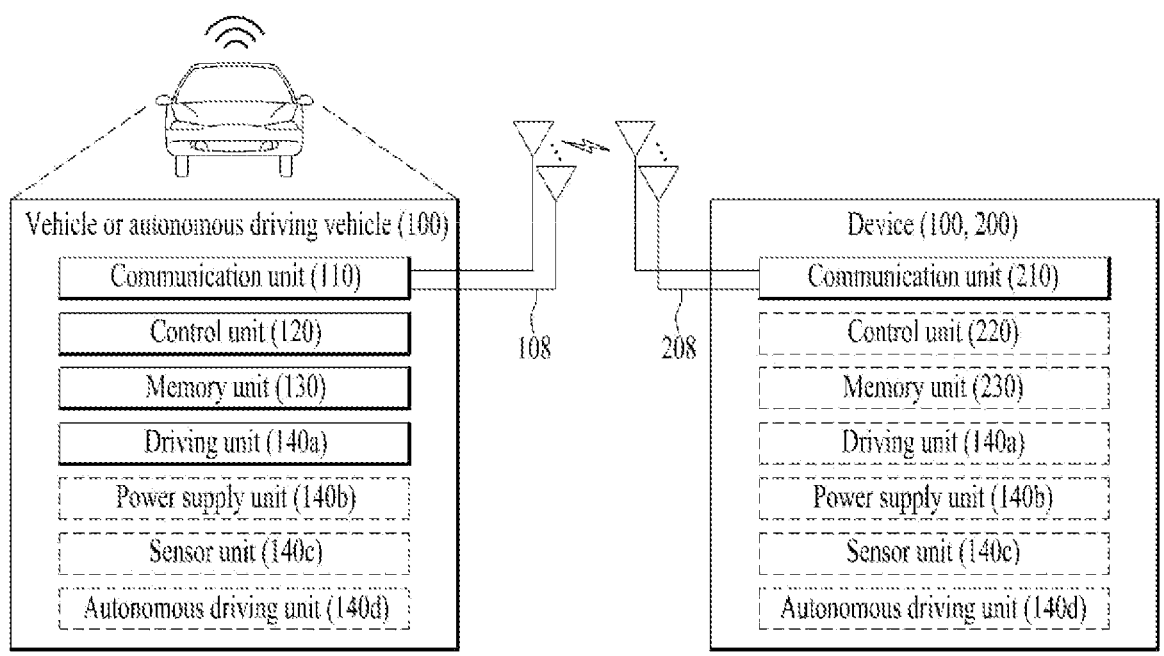
FIG. 22 illustrates a vehicle or an autonomous driving vehicle applied to the present disclosure.

Examples of Vehicles or Autonomous Vehicles to which the Present Disclosure is Applied FIG. 22 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 22, a vehicle or autonomous driving vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 21, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). Also, the driving unit 140*a* may cause the vehicle or the autonomous driving vehicle 100 to drive on a road. The driving unit 140*a* may include an engine, a motor, a powertrain, a wheel, a brake, a steering device, etc. The power supply unit 140*b* may supply power to the vehicle or the autonomous driving vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the acquired data. The control unit 120 may control the driving unit 140*a* such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly acquired data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Here, wireless communication technologies implemented in the wireless devices (XXX, YYY) of the present specification may include LTE, NR, and 6G, as well as Narrowband Internet of Things for low power communication. At this time, for example, the NB-IoT technology may be an example of a Low Power Wide Area Network (LPWAN) technology, and may be implemented in standards such as LTE Cat NB1 and/or LTE Cat NB2, and is not limited to the above-described names. Additionally or alternatively, the wireless communication technology implemented in the wireless devices (XXX, YYY) of the present specification may perform communication based on LTE-M technology. In this case, as an example, the LTE-M technology may be an example of LPWAN technology, and may be referred to by various names such as eMTC (enhanced machine type communication). For example, LTE-M technology may be implemented in at least one of a variety of standards, such as 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M, and is not limited to the above-described names. Additionally or alternatively, the wireless communication technology implemented in the wireless devices (XXX, YYY) of the present specification is at least one of ZigBee, Bluetooth, and Low Power Wide Area Network (LPWAN) considering low power communication, and is not limited to the above-described names. As an example, ZigBee technology can generate personal area networks (PANs) related to small/low-power digital communication based on various standards such as IEEE 802.15.4, and may be called various names.

The embodiments described above are those in which components and features of the present disclosure are combined in a predetermined form. Each component or feature should be considered optional unless explicitly stated otherwise. Each component or feature may be implemented in a form that is not combined with other components or features. In addition, it is also possible to constitute an embodiment of the present disclosure by combining some components and/or features. The order of operations described in the embodiments of the present disclosure may be changed. Some configurations or features of one embodiment may be included in other embodiments, or may be replaced with corresponding configurations or features of other embodiments. It is obvious that the embodiments may be configured by combining claims that do not have an explicit citation relationship in the claims or may be included as new claims by amendment after filing.

In this document, embodiments of the present disclosure have been mainly described based on a signal transmission/reception relationship between a terminal and a base station. Such a transmission/reception relationship is extended in the same/similar manner to signal transmission/reception between a terminal and a relay or a base station and a relay. A specific operation described as being performed by a base station in this document may be performed by its upper node in some cases. That is, it is obvious that various operations performed for communication with a terminal in a network comprising a plurality of network nodes including a base station may be performed by the base station or network nodes other than the base station. The base station may be replaced by terms such as a fixed station, a Node B, an eNode B (eNB), an access point, and the like. In addition, the terminal may be replaced with terms such as User Equipment (UE), Mobile Station (MS), Mobile Subscriber Station (MSS).

In a hardware configuration, the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, a method according to embodiments of the present disclosure may be implemented in the form of a module, a procedure, a function, etc. Software code may be stored in a memory unit and executed by a processor. The memory unit is located at the interior or exterior of the processor and may transmit and receive data to and from the processor via various known means As described before, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure. For example, those skilled in the art may use the components described in the foregoing embodiments in combination. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL AVAILABILITY

The above-described embodiments of the present disclosure are applicable to various mobile communication systems.

What is claimed is:

1. A method of transmitting a sidelink signal by a first user equipment (UE) in a communication system for supporting sidelink communication, the method comprising:
receiving resource configuration information related to a positioning reference signal (PRS);
receiving a first PRS based on the resource configuration information;
measuring an angle of arrival (AoA) based on the first PRS; and
transmitting the sidelink signal based on the first PRS and the measured AoA,
wherein the first UE determines a time resource region related to the sidelink signal based on a pattern of the first PRS, and determines a pattern of a second PRS included in the sidelink signal based on the measured AOA.

2. The method of claim 1,
wherein the pattern of the second PRS is determined as one PRS pattern corresponding to the measured AoA among a plurality of PRS patterns included in the time resource region determined based on the pattern of the first PRS.

3. The method of claim 1,
wherein the sidelink signal including the second PRS is transmitted in the time resource region in a different slot from a slot in which the first PRS is received.

4. The method of claim 1,
wherein the resource configuration information is information for allocating a slot for transmission and reception of the first PRS and the sidelink signal, and
wherein the sidelink signal including the second PRS is transmitted in the time resource region in the same slot as the slot in which the first PRS is received.

5. The method of claim 4,
wherein the slot includes a sub-channel resource pool for control information for scheduling the first PRS, a request PRS resource pool for the first PRS, and a response PRS resource pool for the second PRS.

6. The method of claim 5,
wherein the time resource region is determined as at least one consecutive OFDM symbol pre-related to the pattern of the first PRS in the response PRS resource pool.

7. The method of claim 5,
wherein the slot further includes a transition OFDM symbol positioned between the sub-channel resource pool and the request PRS resource pool.

8. The method of claim 5,
wherein the slot further includes a guard OFDM symbol between the request PRS resource pool and the response PRS resource pool.

9. The method of claim 1,
wherein an AoA offset value for matching with a coordinate system of the second UE is applied to the AoA.

10. The method of claim 9,
wherein the first UE acquires information on a heading angle of a second UE from the second UE that has transmitted the first PRS and calculates the AoA offset value based on the heading angle of the second UE and a heading angle of the first UE.

11. The method of claim 1,
wherein the first UE transmits the first PRS with information on a Tx-Rx time difference (TRTD) to the second UE.

12. A first user equipment (UE) for transmitting a sidelink signal in a wireless communication system for supporting sidelink, the first UE comprising:
a radio frequency (RF) transceiver; and
a processor connected to the RF transceiver,
wherein the processor controls the RF transceiver to receive resource configuration information related to a positioning reference signal (PRS), receive a first PRS based on the resource configuration information, measure an angle of arrival (AoA) based on the first PRS, transmit the sidelink signal based on the first PRS and the measured AoA,
wherein the processor determines a time resource region of the sidelink signal based on a pattern of the first PRS, and determines a pattern of a second PRS included in the sidelink signal based on the measured AOA.

13. A computer-readable recording medium containing at least one computer program for transmitting a sidelink signal by at least one processor in a wireless communication system for supporting sidelink, comprising:

at least one program for causing the at least one processor to perform an operation of transmitting the first PRS; and a computer-readable recording medium storing the at least one computer program, wherein the operation includes:

receiving resource configuration information related to a positioning reference signal (PRS);

receiving a first PRS based on the resource configuration information;

measuring an angle of arrival (AoA) based on the first PRS; and transmitting the sidelink signal based on the first PRS and the measured AoA, wherein the least one processor determines a time resource region of the sidelink signal based on a pattern of the first PRS, and determines a pattern of a second PRS included in the sidelink signal based on the measured AOA.

* * * * *